(12) United States Patent
Iba

(10) Patent No.: US 10,459,215 B2
(45) Date of Patent: Oct. 29, 2019

(54) VIDEO DISPLAY DEVICE

(71) Applicant: KOPIN CORPORATION, Westborough, MA (US)

(72) Inventor: Yoichi Iba, Hachioji (JP)

(73) Assignee: KOPIN CORPORATION, Westborough, MA (US)

( * ) Notice: Subject to any disclaimer, the term of this patent is extended or adjusted under 35 U.S.C. 154(b) by 0 days.

(21) Appl. No.: 15/849,538

(22) Filed: Dec. 20, 2017

(65) Prior Publication Data

US 2018/0307036 A1    Oct. 25, 2018

Related U.S. Application Data

(60) Provisional application No. 62/439,172, filed on Dec. 27, 2016.

(51) Int. Cl.
| | |
|---|---|
| *G02B 25/00* | (2006.01) |
| *G02B 3/04* | (2006.01) |
| *G02B 27/42* | (2006.01) |
| *G02B 27/01* | (2006.01) |
| *G02B 5/18* | (2006.01) |

(52) U.S. Cl.
CPC ............ *G02B 25/001* (2013.01); *G02B 3/04* (2013.01); *G02B 27/0172* (2013.01); *G02B 27/4216* (2013.01); *G02B 5/1876* (2013.01); G02B 2027/011 (2013.01)

(58) Field of Classification Search
CPC .... G02B 25/001; G02B 3/04; G02B 27/4216; G02B 27/0172; G02B 2027/011; G02B 5/1876; G02B 13/0035; G02B 13/004; G02B 13/0045
See application file for complete search history.

(56) References Cited

U.S. PATENT DOCUMENTS

| | | | | |
|---|---|---|---|---|
| 5,446,588 A | * | 8/1995 | Missig | G02B 3/08 359/565 |
| 2018/0143400 A1 | * | 5/2018 | Bone | G02B 13/0035 |

OTHER PUBLICATIONS

Toyohiko Hatada et al., "Induced Effect of Direction Sensation and Display Size" The Journal of the Institute of Television Engineers of Japan, vol. 33 (1979) No. 5P 407-413.

* cited by examiner

*Primary Examiner* — Kimberly N. Kakalec
(74) *Attorney, Agent, or Firm* — Mark S. Peloquin

(57) ABSTRACT

A video display device includes an eyepiece; and a display panel that includes a display plane that has a diagonal length that is not greater than 40 mm, wherein the eyepiece includes a first lens group and a second lens group; the first lens group includes a first element that has a first optical surface on the side of the display panel and a second optical surface on the opposite side, wherein the first optical surface has a negative refractive power, and an outer region of the second optical surface has a negative curvature and is convex; the second lens group includes, a second element that has a Fresnel surface facing the side opposite to the display panel and having a positive refractive power, and a third element that has a Fresnel surface facing the side of the display panel and having a positive refractive power.

8 Claims, 41 Drawing Sheets

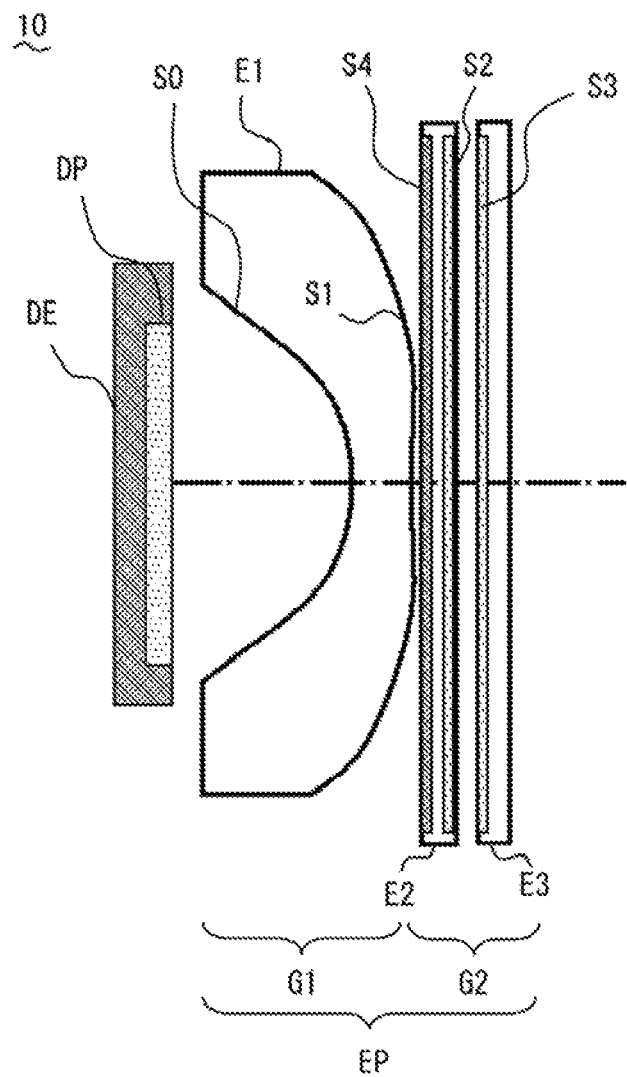
F I G. 3

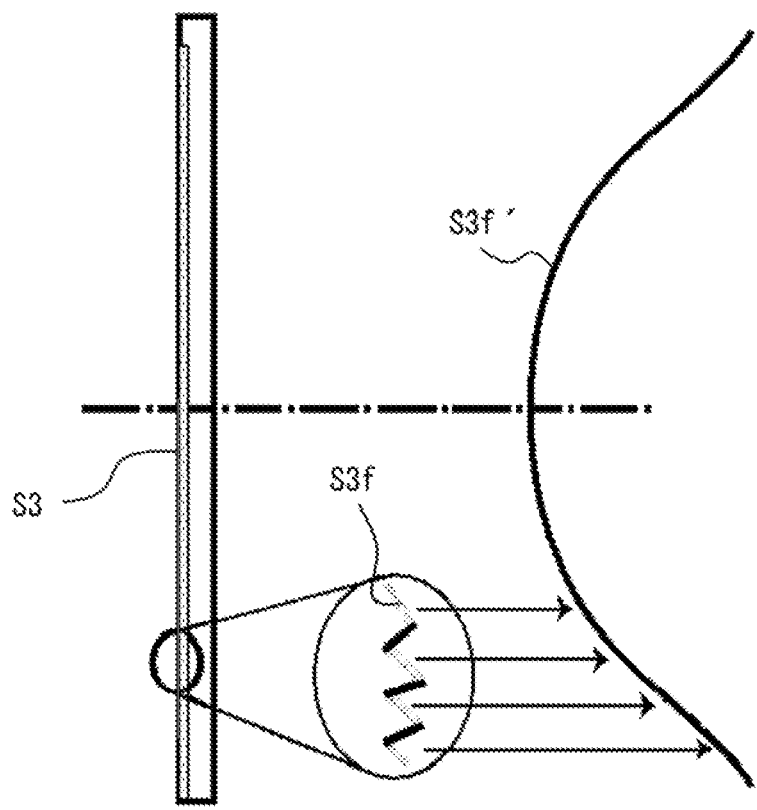
F I G. 6

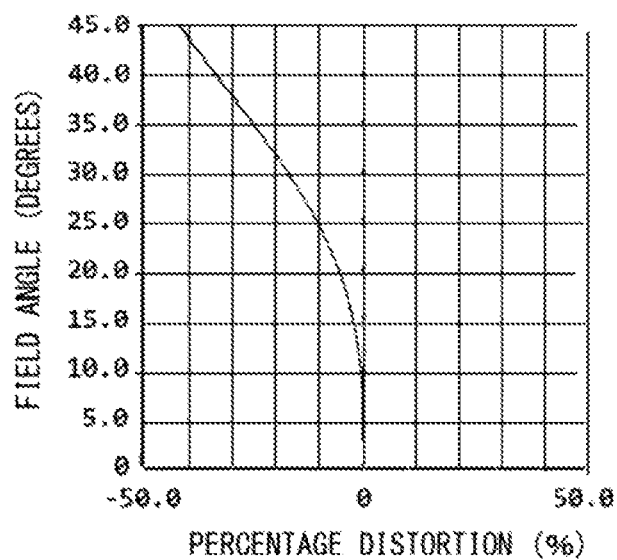
F I G. 27

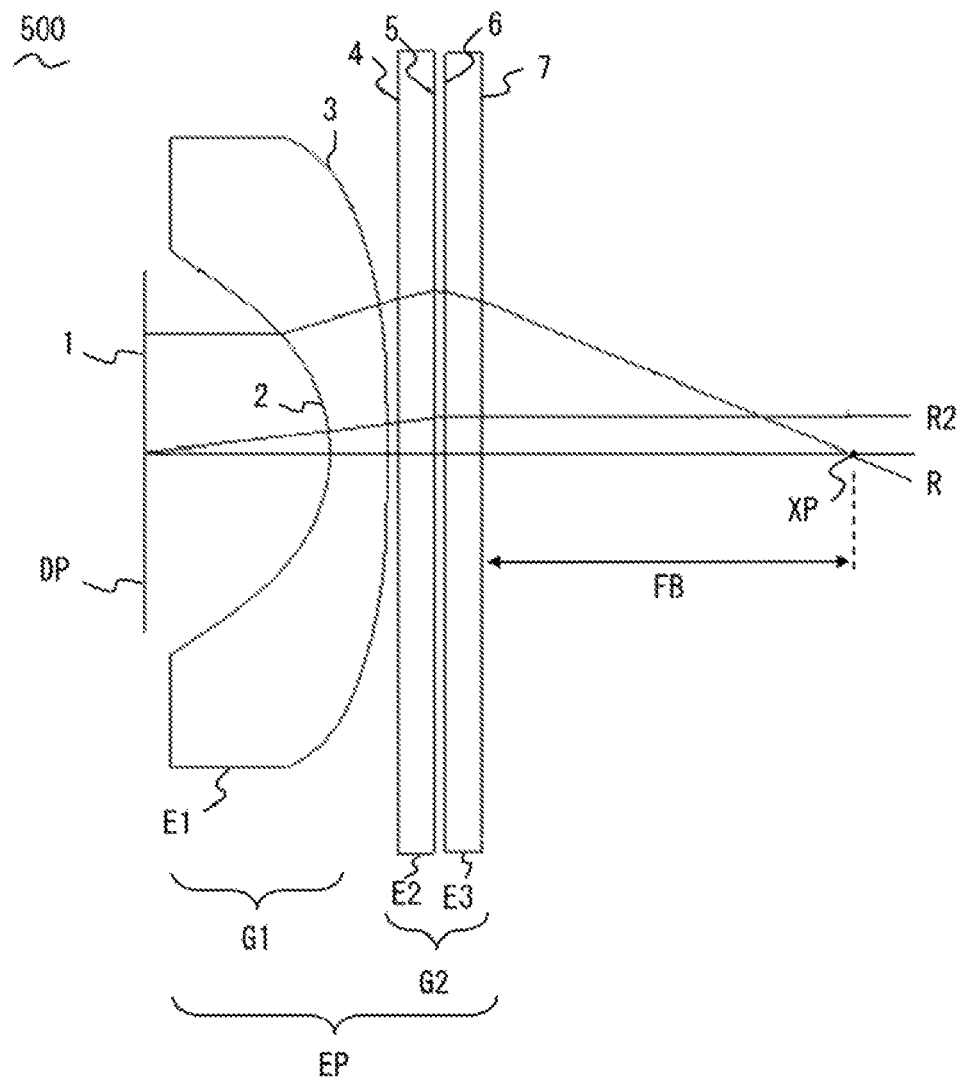
F I G. 35

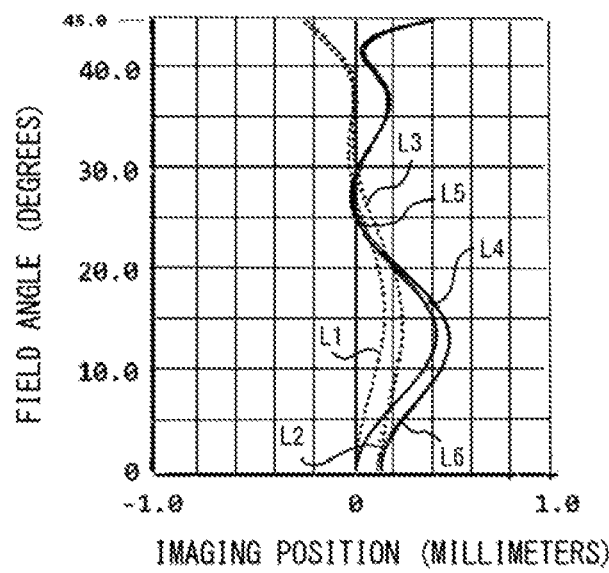
F I G. 40

VIDEO DISPLAY DEVICE

CROSS-REFERENCE TO RELATED APPLICATIONS

This patent application claims priority from U.S. Provisional Patent Application titled "Image Display Device" filed on Dec. 27, 2016, Ser. No. 62/439,172. U.S. Provisional Patent Application 62/439,172 is hereby incorporated by reference.

BACKGROUND OF THE INVENTION

1. Field

The present invention relates to a near-to-eye video display device.

2. Background

In the past, efforts have been made toward developing a virtual reality system by use of an HMD (head mounted display). When an HMD is used for a virtual reality system, a sense of realism is important. Non Patent Document 1 (Toyohiko Hatada, Haruo Sakata, and Hideo Kusaka, The Journal of the Institute of Television Engineers of Japan Vol. 33 (1979), No. 5 P 407-413) discloses that a greater sense of realism is attained with an increase in a maximum field angle of a video and that the sense of realism reaches a level of saturation at an angle of 80 degrees. Thus, in order to increase the sense of realism, a small and easy-to-use HMD with a maximum field angle that is greater than 80 degrees that is suitable for practical use is desired to be developed.

SUMMARY

A video display device according to an aspect of the present invention is a near-to-eye video display device that includes: an eyepiece; and a display panel that includes a display plane that outputs light and has a diagonal length that is not greater than 40 mm near a front focal position of the eyepiece, wherein the eyepiece includes a first lens group and a second lens group in order from a side of the display panel in a positive direction, where the positive direction is a direction in which light emitted from the display panel travels along an optical axis of the eyepiece; the first lens group includes a first element that is a refractive lens and that has a first optical surface on the side of the display panel and a second optical surface on a side of the positive direction, wherein the first optical surface has a negative refractive power, and an outer region of the second optical surface has a negative curvature and is convex toward the outside of a lens medium; the second lens group includes, in order from the display panel in the positive direction, a second element that has a Fresnel surface facing the side of the positive direction and having a positive refractive power, and a third element that has a Fresnel surface facing the side of the display panel and having a positive refractive power, the second element and the third element being arranged close to each other; and the eyepiece emits light at a maximum field angle that is not less than 80 degrees.

BRIEF DESCRIPTION OF THE DRAWINGS

The present invention will be more apparent from the following detailed description when the accompanying drawings are referenced.

FIG. 3 illustrates a configuration of the video display device according to another modification of the embodiment;

FIG. 6 illustrates a portion of the configuration of the video display device according to the yet another modification of the embodiment;

FIG. 27 is another graph that illustrates the imaging performance of the eyepiece;

FIG. 35 illustrates a lens configuration of a video display device according to a fifth example;

FIG. 40 is a graph that illustrates an imaging performance of the eyepiece; and

DESCRIPTION OF EMBODIMENTS

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Conventionally, if an HMD with a maximum field angle that is greater than 80 degrees is created in order to give a user a greater sense of realism, it will be difficult to make it smaller.

It is preferable that an eyepiece of an HMD that guides video light be a telecentric optical system that has excellent video-light properties. In this case, taking into consideration usability in wearing the HMD, such as ensuring a distance for the eyepiece such that it does not come into contact with the user's eyelashes, it is preferable that an eye point, which is a focal position of the eyepiece, be situated 15 mm or more away from the eyepiece.

Further, conventionally, in an eyepiece included in an HMD with a maximum field angle that is greater than 80 degrees, the number of lenses is reduced in order to make the HMD lighter, and an aspherical convex lens is used as a primary element, so it is often the case that the convex lens provides most of the refractive power of the eyepiece.

It is often the case that there is a need to provide an eyepiece having a focal length of 30 mm or more when the problem described above is taken into consideration and the eyepiece is designed to have a reduced refractive power in order to sufficiently suppress an aberration that may occur in a convex lens. However, when an HMD ensuring a maximum field angle that is greater than 80 degrees is created using a conventional eyepiece having a focal length that is not less than 30 mm, there is a need for a display panel that outputs a video to have a diagonal length that is not less than 50 mm, which results in making the device larger.

In other words, it is difficult to achieve a maximum field angle of 80 degrees and a reduced size at the same time.

In light of the problem described above, an object of the present invention is to provide a small near-to-eye video display device with a maximum field angle that is greater than 80 degrees.

Figure 1:
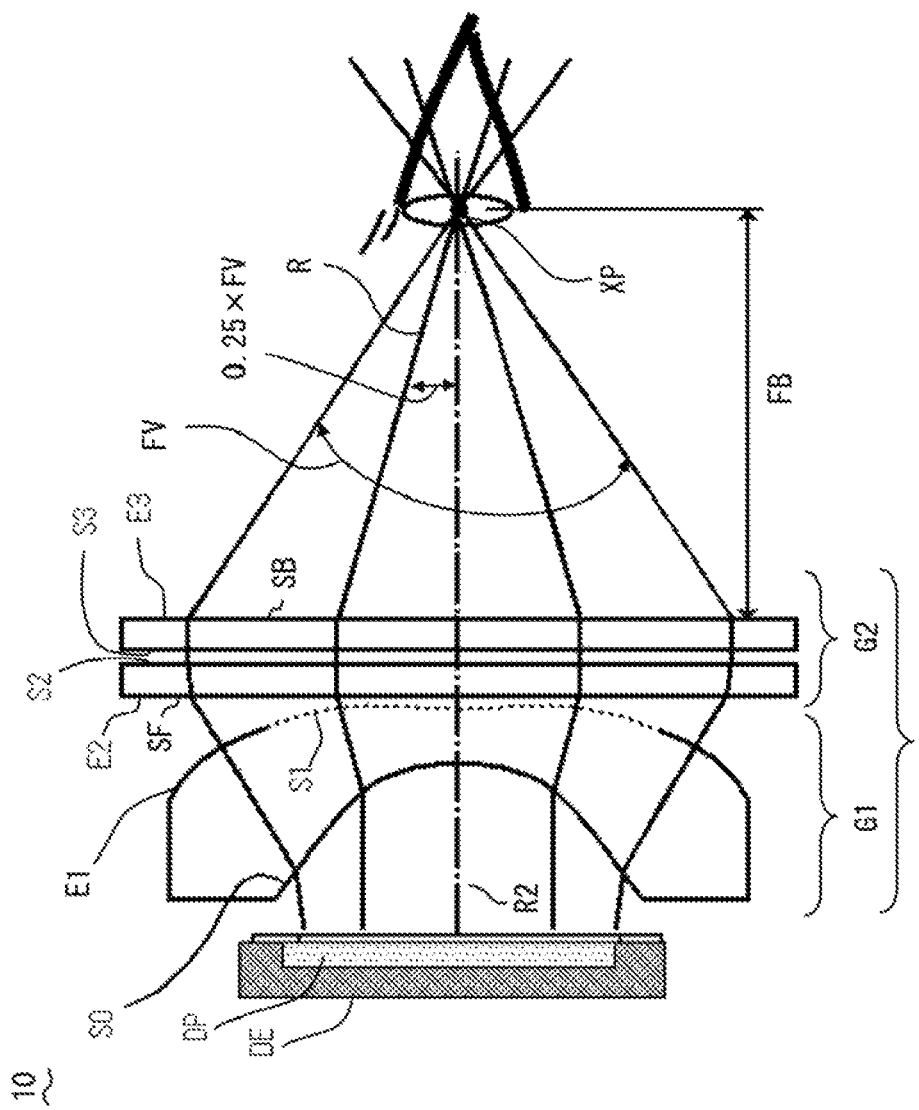
FIG. 1 illustrates a configuration of a video display device according to an embodiment.

A video display device 10 according to embodiments of the present invention is described below. FIG. 1 illustrates a configuration of the video display device 10.

The video display device 10 includes a display panel DE and an eyepiece EP. The video display device 10 is a near-to-eye video display device, in which the eyepiece EP guides light output by the display panel DE directly to the eyes of a user. In the following descriptions, the direction in which light travels along an optical axis of the eyepiece EP from the display panel DE is referred to as a positive direction.

The display panel DE includes, near a front focal position of the eyepiece EP, a display plane DP that outputs light. It is assumed that the display plane DP has a diagonal length that is not greater than 40 mm.

The eyepiece EP includes a first lens group G1 and a second lens group G2 in order from the display panel DE in the positive direction. It is preferable that the eyepiece EP be a telecentric optical system that guides a principal ray that is substantially parallel to the optical axis of the eyepiece EP.

The first lens group G1 includes a first element E1 that is a refractive lens and that has an optical surface S0 (first optical surface) on the side of the display panel DE and an optical surface S1 (second optical surface) on the side of the positive direction, wherein the optical surface S0 has a negative refractive power and the optical surface S1 has a positive refractive power on its outer region.

Specifically, due to an action of the negative refractive power, the optical surface S0 refracts a light ray (that is hereinafter also referred to as a principal ray and is output in a direction substantially perpendicular to the display plane DP) that passes through an effective rear focal point XP that will be described later, such that the light ray has a positive inclination with respect to the optical axis of the eyepiece EP. The state in which the inclination of a light ray with respect to the optical axis is positive refers to a state in which the light ray is inclined in a divergent direction with respect to the optical axis, and the state in which the inclination of a light ray with respect to the optical axis is negative refers to a state in which the light ray is inclined in a convergent direction with respect to the optical axis.

Further, the outer region of the optical surface S1 (second optical surface) is convex toward the outside of a medium (lens medium). In other words, a principal ray that has a positive inclination by being refracted on the optical surface S0 is incident on the optical surface S1 at a relatively small angle, which results in a decreased refractive action on the optical surface S1. Thus, a principal ray that is incident on the first lens group G1 still maintains a positive inclination after the light ray is refracted on the optical surfaces S0 and S1, and is emitted to the second lens group G2.

The second lens group G2 includes, in order from the display panel DE in the positive direction, a second element E2 that has an optical surface S2 facing the side of the positive direction, and a third element E3 that has an optical surface S3 facing the side of the display panel DE, wherein the optical surface S2 is a Fresnel surface that has a positive refractive power and the optical surface S3 is a Fresnel surface that has a positive refractive power. The second element E2 and the third element E3 are arranged close to each other.

According to this arrangement, the principal ray that is incident on the second lens group G2 is gradually refracted on the optical surface SF and the Fresnel surface (optical surface S2) of the second element E2, and on the Fresnel surface (optical surface S3) and an optical surface SB of the second element E3, so as to become a light ray that has a negative inclination when it is emitted from the second lens group G2. In other words, when the optical surface S2 is arranged facing the side of the positive direction and the optical surface S3 is arranged facing the side of the display panel DE, as described above, it is possible to vary the inclination of the light ray more gradually in four stages, which results in providing the advantage of suppressing an aberration that occurs in the second lens group G2.

Further, in another exemplary configuration, each surface of each element in the second lens group G2 has a spherical shape or an aspherical shape, which provides increased design latitude. This results in being able to suppress an aberration that occurs in the eyepiece EP. In particular, the optical surface SF of the second element E2 that faces the side of the display panel DE is concave. In general, among aberrations that occur when a light ray is refracted on an optical surface, there is an aberration that increases in proportion to the third power or the fifth power of an angle of incidence on the optical surface (an angle formed by the normal line of the optical surface and a light ray that is incident on the optical surface). In the eyepiece EP, a principal ray has a large positive inclination when the principal ray is incident on the optical surface SF, so an angle of incidence on the optical surface SF becomes larger and a large aberration is likely to occur. However, when the optical surface SF facing the side of the display panel DE is concave, it is possible to reduce the incident angle, which results in being able to suppress an aberration that occurs on the optical surface SF effectively.

When the case in which a principal ray is emitted from the eyepiece EP at a point near the optical axis and the case in which a principal ray is emitted from the eyepiece EP at a point away from the optical axis are compared, the light collection point may actually be slightly different in a direction of the optical axis due to a spherical aberration of a pupil. Thus, a point of intersection of a light ray R and the optical axis of the eyepiece EP is defined as an effective rear focal point XP, the light ray R being a light ray that is output from the display plane DP in a direction perpendicular to the display plane DP and whose inclination angle to the optical axis when the light ray is emitted from the eyepiece EP is one fourth of a maximum field angle of the eyepiece EP (that is, one-half of a half field angle). Taking into consideration the difference due to the spherical aberration of a pupil, the point of intersection of the light ray R and the optical axis is a point situated substantially in the center among points of intersection of respective light rays with the optical axis, and is a point such that the difference in a light collection point between the point and each point of intersection is smallest. The eyepiece EP acts as a telecentric optical system with this effective rear focal point XP being used as an eye point.

The action of the video display device 10 having the above configuration is described below.

A distance FB between the eyepiece EP and the effective rear focal point XP is substantially proportional to a ray height when a principal ray, which makes an image of a maximum field angle, is emitted from the second lens group G2 where the maximum field angle is constant. Further, the second element E2 and the third element E3 included in the second lens group G2 are arranged close to each other, so the maximum ray height in each of the elements is substantially equal in the second lens group G2. Thus, the distance FB is substantially proportional to the maximum ray height in the second lens group G2.

The height of a principal ray when the light ray is incident on the second lens group G2 becomes higher when the magnitude of a negative refractive power of the optical surface S0 of the first lens group G1 becomes larger. Thus, if the magnitude of the refractive power of the optical surface S0 is adjusted, the distance FB between the effective rear focal point XP and the eyepiece EP can be adjusted so as to be a suitable distance such that, for example, the eyepiece EP does not contact the eyelashes of a person when the person looks into the video display device 10. In general, it is sufficient if the suitable distance is not less than 15 mm.

In this case, the focal length of the eyepiece EP is less affected by changing the magnitude of the refractive power of the optical surface S0, as will be described below. Thus, when the magnitude of the refractive power of the optical surface S0 is changed, it is sufficient if the refractive powers of the other optical surfaces are just slightly adjusted in order to cancel out a change in focal length that may occur. In other words, the distance FB can be easily adjusted while maintaining a specified focal distance in the eyepiece EP.

Expression (1) below holds when the refractive powers of the optical surface S0, the optical surface S1, the optical surface S2, and the optical surface S3 are Pa, Pb, Pc, and Pd, respectively, and when the ray heights of a light ray R2 on the optical surface S0, on the optical surface S1, on the optical surface S2, and on the optical surface S3 are Ha, Hb, Hc, and Hd, respectively. The light ray R2 refers to a light ray that is output from the center of the display plane DP and slightly inclined with respect to the optical axis of the eyepiece EP.

$$P0 \propto Ha \times Pa + Hb \times Pb + Hc \times Pc + Hd \times Pd \tag{1}$$

Considering that the ray height Ha is less than the ray height Hb, the ray height Hc, and the ray height Hd, it follows that the focal length of the eyepiece EP is less affected by changing the magnitude of the refractive power Pa.

The display panel DE whose display plane DP has a diagonal length that is not greater than 40 mm is used in the video display device 10, so the focal length is set to 25 mm or less using the following conditional expression, in order to achieve a field angle that is not less than 80 degrees to give a user a greater sense of realism. Further, there is a need to yield this focal length mostly using the second lens group G2.

When the diagonal length of the display plane DP is DL, the focal length of the eyepiece EP is FL, and the maximum field angle of the eyepiece EP is FV, the conditional expression holds as described below, and the condition for the focal length FL is obtained. In this case, an effective focal length refers to a focal length obtained by tracing an actual light ray. Even if an image distortion that occurs in the eyepiece EP is taken into consideration, there will not be a significant difference in the condition for the focal length FL.

$$DL = 2 \times FL \times \tan(FV/2) \tag{2}$$

$$FL = DL/(\{2 \times \tan(FV/2)\} \leq 40 \text{ mm}/\{2 \tan(80°/2)\} \approx 25 \text{ mm} \tag{3}$$

Here, when the height of a maximum principal ray on the emission surface of the second lens group G2 is H, H is obtained as below using the condition described above.

$$H \approx FB \times \tan(FV/2) \approx 12.5 \text{ mm}$$

Since the heights of the principal rays in the respective elements in the second lens group G2 are substantially equal, it is preferable that an effective diameter of the element (the second element E2, E3) in the second lens group G2 be twice the height of a maximum principal ray or more, that is, 25 mm or more.

The center of eye rotation is situated in an eyeball and 10 mm away from a pupil, and taking into consideration the case in which the eyes of a user are rotated such that the gaze of the user is turned on around a video, an amount of shift of the pupil is obtained by calculating "10 mm× tan(80°/2)=8.4 m". Thus, it is preferable that "(12.5+8.4)× 2≈40 mm" or more be ensured as the effective diameter of the element in the second lens group G2.

As described above, there is a need to satisfy the following conditions: the eyepiece EP has a focal length that is not greater than 25 mm, and the F-number (focal length/effective diameter) of the second lens group G2 for a principal ray is smaller than "25 mm/25 mm=1", and preferably, smaller than "25 mm/40 mm≈0.6".

In this case, the second lens group G2 includes the second element E2 and the third element E3 that are arranged such that the optical surface S2 that is a Fresnel surface of the second element E2 and the optical surface S3 that is a Fresnel surface of the third element E3 are situated close to each other, and a necessary F-number is ensured due to a strong positive refractive power of a Fresnel surface. The configuration of the second lens group G2 that includes elements each having a Fresnel surface makes it possible to provide a lighter and smaller device, compared to the case of a lens configuration that ensures the F-number described above using other lens elements (such as a refractive-lens element that has a typical concavo-convex shape). In general, the thickness of such a lens element is increased if it has a stronger refractive power, so it will be difficult even to set, to 15 mm or more, a distance between the eyepiece EP and the effective rear focal point XP, which is an eye point, if the necessary condition that the eyepiece EP have a focal length that is not greater than 25 mm is satisfied.

Further, according to the configuration of the second lens group G2, in which the optical surface SF, the Fresnel surface S2, the Fresnel surface S3 and the optical surface SB are arranged in accordance with a positive order, the inclination of the principal ray is changed gradually by the working of the optical surface SF and SB not only of the optical surface S2 and S3. Accordingly, it is possible to suppress an aberration that occurs on the second lens group G2 that has an large optical power.

It is preferable that Conditional Expression (4) below be satisfied in order to gradually vary the inclination of a light ray as just described.

$$|P2-P3|/(P2+P3)<0.3 \quad (4)$$

If the refractive power P2 on the optical surface S2 and the refractive power P3 on the optical surface 83 are substantially equal to each other, it will be possible to uniformly vary the inclination of the light ray.

If each surface of each element in the second lens group G2 is made to be spherical surface or aspherical surface, it will be possible to suppress an aberration of the eyepiece EP because of increasing of designing degrees of freedom. Especially in the second lens group G2, the optical surface SF on the side of the display panel DE is comprised of concave surface toward the display panel DE so that a principal ray gets close to the perpendicular direction of the optical surface SF (in other words, angle of incident decreases). Then the optical surface SF contributes to suppress an aberration.

As described above, the video display device 10 has a small lens-configuration that includes the display panel DE having a display plane whose diagonal length is not greater than 40 mm, a refractive lens, and elements each having a Fresnel surface, and such a configuration makes it possible to provide a video of a maximum field angle that is greater than 80 degrees to give a user a greater sense of realism. Further, an aberration that occurs in an element having a strong refractive power is also suppressed, which makes it possible to provide a good video quality.

A preferable configuration of the video display device 10 according to the embodiment of the present invention is described below.

Figure 2:
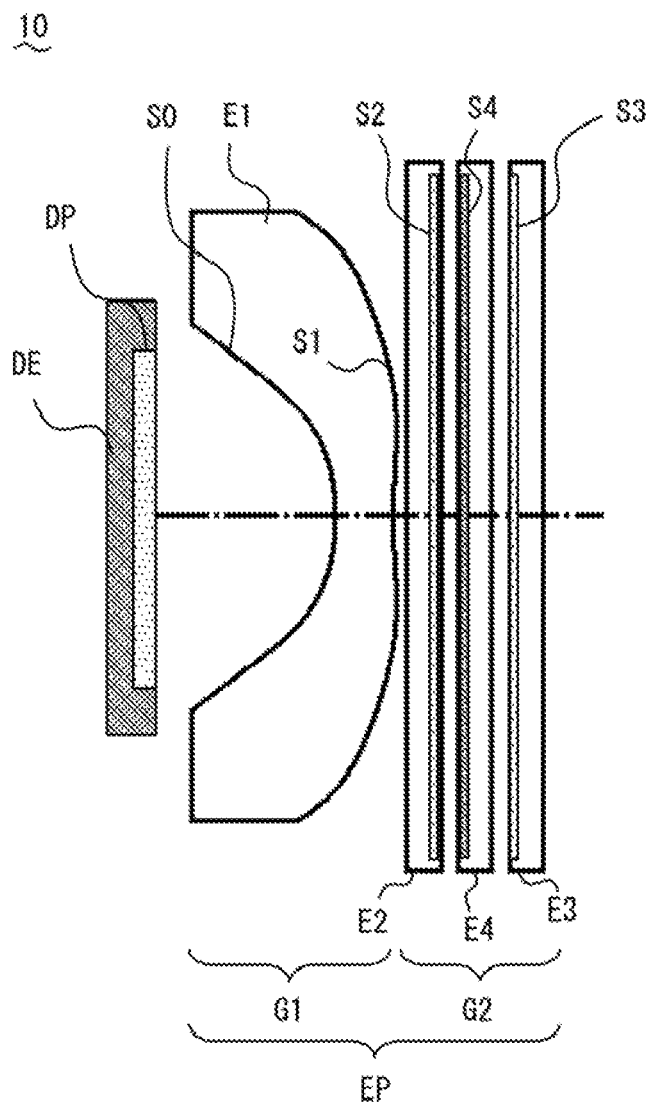
FIG. 2 illustrates a configuration of the video display device according to a modification of the embodiment.

FIG. 2 illustrates a configuration of the video display device 10 according to a modification. As illustrated in FIG. 2, the video display device 10 may include, in the second lens group G2, an element (fourth element E4) that has an optical surface S4 that is a DOE (diffractive optical element) surface having a positive refractive power.

In general, the DOE surface has a very large chromatic dispersion opposite to the chromatic dispersion of glass or plastic, and when the DOE surface configures the optical system in combination with refraction element the advantage of eliminating a chromatic aberration of the optical system is provided.

This modification reduces a chromatic aberration that occurs on each of the optical surfaces S2 and S3 that are Fresnel surfaces causing a large chromatic aberration and having a strong positive refractive power, using the characteristics of a DOE surface described above. Specifically, the fourth element E4 is arranged such that the optical surface S4 that is a DOE surface is situated close to the optical surfaces S2 and S3 that are Fresnel surfaces. More specifically, the fourth element E4 is arranged close to the second element E2 and the third element E3 such that the distance between the optical surface S2 and the optical surface S4 that is a DOE surface, and the distance between the optical surface S3 and the optical surface S4 are sufficiently shorter than the focal length (the effective focal length) of the eyepiece EP. This arrangement makes it possible to correct an axial chromatic aberration and a lateral chromatic aberration at the same time in a balanced manner, the axial chromatic aberration and the lateral chromatic aberration occurring on each of the optical surfaces S2 and S3 that are Fresnel surfaces.

Here, it is preferable that, with respect to the optical surface S2 that is a Fresnel surface of the second element E2, the optical surface S3 that is a Fresnel surface of the third element E3, and the DOE surface, the distance on the optical axis of the eyepiece EP between one of these surfaces that is situated closest to the side of the display panel DE and another one of these surfaces that is situated closest to the side of the positive direction be one third of the focal length (the effective focal length) FL of the eyepiece EP or less.

FIG. 2 illustrates an example of arranging the DOE surface, and the arrangement of the DOE surface is not limited to the configuration of FIG. 2. For example, the second element E2 may have the DOE surface S4 on its optical surface facing the side of the display panel DE, as illustrated in FIG. 3. This makes the entire second lens group G2 thicker. It is sufficient if the DOE surface is arranged close to the principal points of the optical surfaces S2 and S3, in order to sufficiently provide the advantage of correcting the axial chromatic aberration and the lateral chromatic aberration that occur on each of the optical surfaces S2 and S3.

On the other hand, when the principal ray that is incident on the DOE surface is inclined with respect to the DOE surface, diffracted light of an unnecessary order is likely to occur. Thus, it is preferable that the DOE surface be arranged between the optical surface S2 that is a Fresnel surface of the second element and the optical surface S3 that is a Fresnel surface of the third element, as illustrated in FIG. 2, in order to cause the light ray that is incident on the DOE surface to enter the DOE surface from a direction that is as perpendicular to the DOE surface as possible so as to reduce the diffracted light of an unnecessary order. In a process of gradually refracting a principal ray in the eyepiece EP, the principal ray comes close to being parallel to the optical axis of the eyepiece EP between the optical surfaces S2 and S3. This permits a principal ray that is incident on the DOE surface to travel in the direction perpendicular to the DOE surface.

Further, it is preferable that the video display device 10 having a DOE surface as illustrated in FIGS. 2 and 3 satisfy the following conditional expression.

$$V0=(V2+V3)/2$$

$$3.453\times(P0/V0)\times0.7<P4<3.453\times(P0/V0)\times1.3 \quad (5)$$

In Conditional Expression (5) described above, the refractive power of the eyepiece EP is P0 (=1/FL), the refractive power of the optical surface S4 is P4, and the Abbe numbers of the second element E2, the third element E3, and the fourth element E4 are V2, V3, and V4 (=−3.453), respectively.

The chromatic aberration of the eyepiece EP is greatly affected by V2 and V3 because most of the refractive power of the eyepiece EP is created by the second element and the third element. Taking this into consideration, Expression (6) below can be obtained as a conditional expression that cancels out the chromatic aberration of the eyepiece EP, which does not include a DOE, using the optical surface S4 that is a DOE surface. When the known Abbe number V4 (=−3.453) of the fourth element E4 having a DOE surface is substituted into Expression (6), Expression (7) is obtained as below.

$$P0/V0+P4/V4\approx0 \quad (6)$$

$$P4\approx3.453\times(P0/V0) \quad (7)$$

For practical use, in order to better correct a chromatic aberration of the eyepiece EP, there is no need to satisfy Expression (7) absolutely, but it is sufficient if P4 is determined such that Conditional Expression (5) is satisfied.

If the power of a DOE is strong, pitches of grooves that constitute the DOE will be narrow, which results in difficulty in processing the DOE. Taking this into consideration, the lower limit for the DOE is lower in Conditional Expression (5') than in Conditional Expression (5), and it is also possible to sufficiently provide the advantage of correcting a chromatic aberration under the condition in Conditional Expression (5').

$$3.453\times(P0/V0)\times0.5<P4<3.453\times(P0/V0)\times1.3 \quad (5')$$

Figure 4:
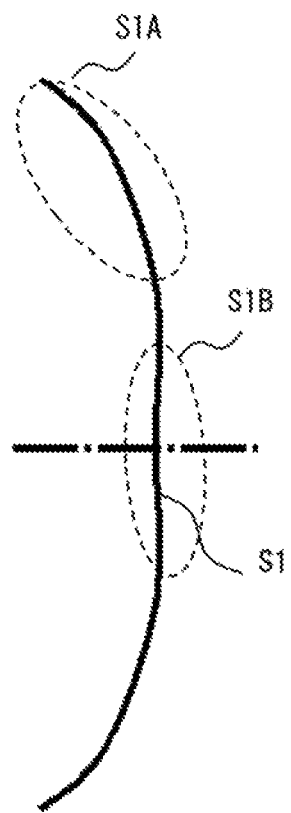
FIG. 4 illustrates a portion of a configuration of the video display device according to yet another modification of the embodiment.
Figure 5:
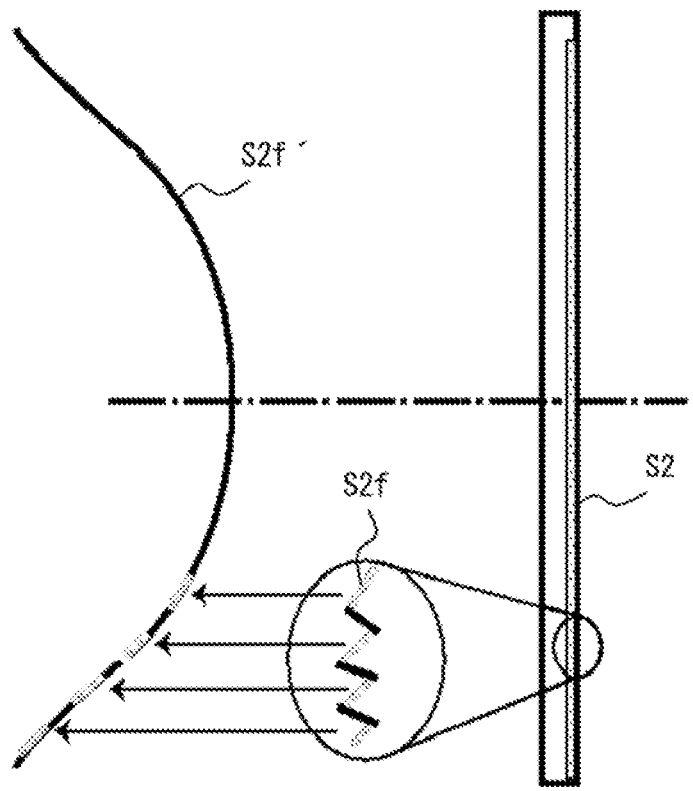
FIG. 5 illustrates a portion of the configuration of the video display device according to the yet another modification of the embodiment.

FIGS. 4, 5, and 6 illustrate portions of a configuration of the video display device 10 according to yet another modification. FIGS. 4, 5, and 6 illustrate a shape of the optical surface S1 of the first element E1, a shape of the optical surface S2 of the second element E2, and a shape of the optical surface S3 of the third element E3, respectively.

As illustrated in FIG. 4, the curvature of the optical surface S1 of the first element E1 (the second optical surface) varies in the positive direction from an outer region S1A to a point intersecting the optical axis (an optical-axis region S1B). In other words, the optical surface S1 has a stronger refractive power in the positive direction on the outer region S1A, compared with the refractive power on the optical-axis region S1B.

As illustrated in FIG. 5, the optical surface S2 of the second element E2 includes optical surfaces S2f, in the Fresnel surface, that are concentrically arranged and contribute optically, and the curvature of a connected surface S2f' formed by virtually connecting the optical surfaces S2f varies in the positive direction from a point intersecting the optical axis to an outer region. The optical surface S2f refers to a surface that is included in the Fresnel surface and that contributes optically so as to guide a light ray to an optical system posterior to the second element E2. In other words, the optical surface S2 has a stronger refractive power in the positive direction on the optical-axis region, compared with the refractive power on the outer region.

As illustrated in FIG. 6, the optical surface S3 of the third element E3 includes optical surfaces S3f, in the Fresnel surface, that are concentrically arranged and contribute optically, and the curvature of a connected surface S3f' formed by virtually connecting the optical surfaces S3f varies in a negative direction from a point intersecting the optical axis to an outer region. In other words, as in the case of the optical surface S2, the optical surface S3 has a stronger refractive power in the positive direction on the optical-axis region, compared with the refractive power on the outer region.

In general, an optical system of an HMD with a maximum field angle that is greater than 80 degrees causes a pincushion-type image distortion. Thus, it is often the case that a video signal is changed so as to distort a video displayed on a display panel of the HMD in a barrel pattern, which results in being able to display a video without distortion. In this modification, the eyepiece EP included in the video display device 10 also causes a pincushion-type image distortion in order to be compatible with a widely used HMD with a maximum field angle that is greater than 80 degrees, as described above, so that a video signal provided for the widely used HMD can be used.

When the elements illustrated in FIGS. 4, 5, and 6 are included, a principal ray whose ray height is great (principal ray Re) is more greatly subjected to the refractive action of the positive refractive power of the optical surface S1 than a principal ray whose ray height is small (principal ray Rc). Further, the principal ray Rc is more greatly subjected to the refractive actions of the positive refractive powers of the optical surfaces S2 and S3 than the principal ray Re. In both cases, the display plane DP is arranged near the front focal position of the eyepiece EP, so the effective focal length of the eyepiece EP when an image of the principal ray Re whose ray height is great is formed is shorter than the effective focal length of the eyepiece EP when an image of the principal ray Rc whose ray height is small is formed. Thus, the magnification of a virtual image generated by the principal ray Re is greater than the magnification of a virtual image generated by the principal ray Rc.

As described above, the magnification of a virtual image is greater in a region with a large field angle than in a region with a small field angle, that is, the outer region of a video is magnified more greatly than the center region of the video. Thus, the eyepiece EP causes a pincushion-type image distortion under the condition described above.

Specific examples of the video display device described in the embodiments are described below.

FIRST EXAMPLE

Figure 7:
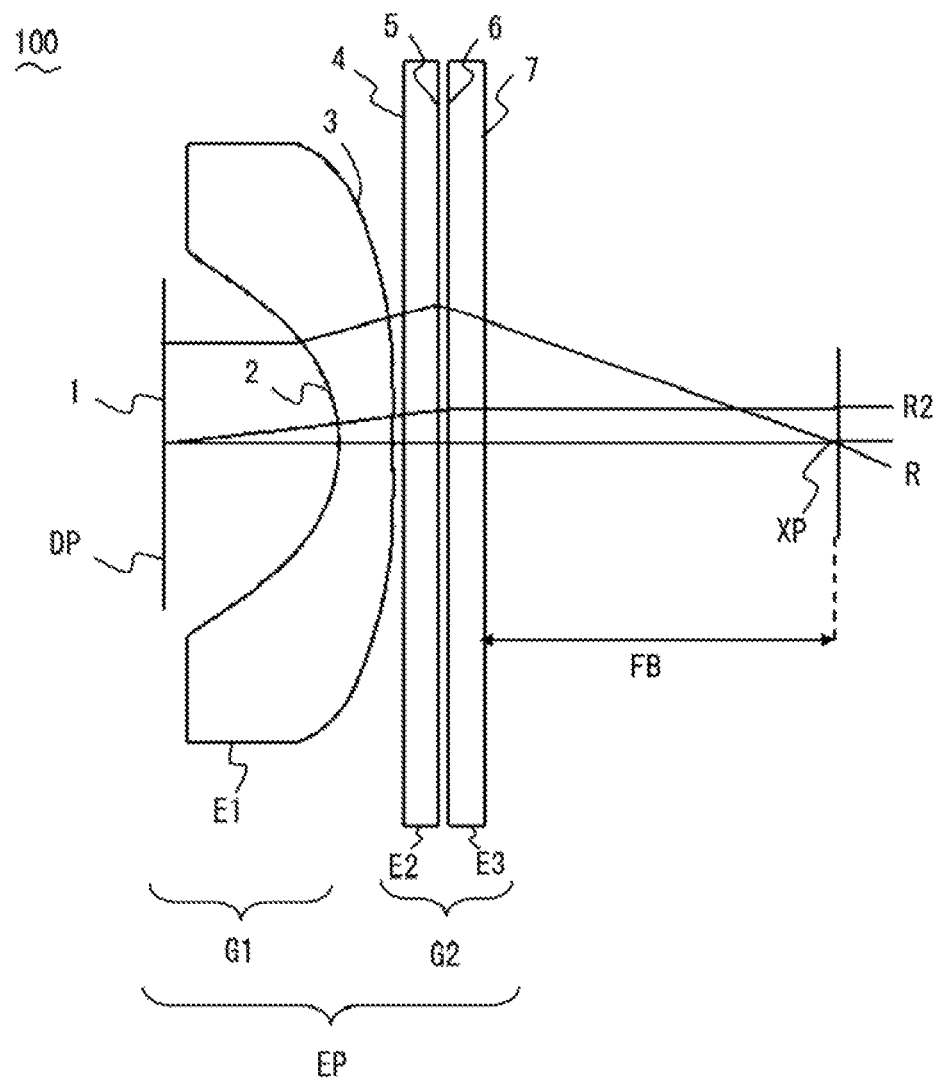
FIG. 7 illustrates a lens configuration of a video display device according to a first example.

FIG. 7 illustrates a lens configuration of a video display device 100 according to a first example. The eyepiece EP of the video display device 100 includes a first lens group G1 and a second lens group G2.

The first lens group G1 includes a first element E1 that is a refractive lens and that has an optical surface S0 on the side of the display plane DP and an optical surface S1 on the side of the positive direction, wherein the optical surface S0 has a negative refractive power, and the outer region of the optical surface S1 has a negative curvature and is convex toward the outside of a lens medium. The curvature of a surface of each element will be described in detail later.

The second lens group G2 includes a second element E2 that has a Fresnel surface (optical surface S2) facing the side of the positive direction, and a third element E3 that has a Fresnel surface (optical surface S3) facing the side of the display plane DP.

The following is lens data according to the first example (Table 1).

TABLE 1

| Surface No. | R' | T | nd | vd | Effective Radius |
|---|---|---|---|---|---|
| 1 | ∞ | 9.39 | 1 | 0 | |
| 2 | ∞ | 3.1 | 1.534 | 56 | 10.7 |
| 3 | −17.954 | 0.6 | 1 | 0 | 17.0 |
| 4 | ∞ | 2 | 1.534 | 56 | 21.0 |
| 5 | ∞ | 0.6 | 1 | 0 | 21.9 |
| 6 | ∞ | 2 | 1.534 | 56 | 21.9 |

TABLE 1-continued

| Surface No. | R' | T | nd | vd | Effective Radius |
|---|---|---|---|---|---|
| 7 | ∞ | 20.15 | 1 | 0 | 21.1 |
| 8 | — | −1000 | 1 | 0 | |
| 9 | — | 0 | 1 | 0 | |

R' represents a radius of curvature (mm) on the optical axis of the eyepiece EP with respect to surface numbers 1, 4, and 7, and represents a parameter for obtaining C in Expressions (8) and (9) described later with respect to surface numbers 2, 3, 5, and 6. T represents a surface interval (mm), nd represents a refractive index, and vd represents an Abbe number. The surface number 1 represents the display plane DP of the display panel DE. The surface numbers 2 to 7 represent optical surfaces that constitute the eyepiece EP. The surface number 2 corresponds to the optical surface S0. The surface number 3 corresponds to the optical surface S1. The surface number 5 corresponds to the optical surface S2. The surface number 6 corresponds to the optical surface S3. A surface number 8 represents a position of the pupil of the eye of a user. A surface number 9 represents a surface of a virtual image that is presented to the user.

Surfaces represented by the surface numbers 2 and 3 are aspherical surfaces, and their sags Z are defined using Expression (8) below.

$$Z(s) = \frac{Cs^2}{1 + \sqrt{1 - 1(1+k)C^2 s^2}} + A2s^2 + A4s^4 + A6s^6 + A8s^8 + A10s^{10} \quad (8)$$

s is a distance from the optical axis of the eyepiece EP, C is a value represented by 1/R', k is a constant, and A2, A4, A6, and A8 are constants that are parameters for the respective orders.

Surfaces represented by the surface numbers 5 and 6 are Fresnel surfaces, and the sag Z of a connected surface formed by virtually connecting optical surfaces that are concentrically arranged in the Fresnel surface (surface number 5, 6) is defined using Expression (9) below.

$$Z(s) = \frac{Cs^2}{1 + \sqrt{1 - 1(1+k)C^2 s^2}} + A2s^2 + A4s^4 + A6s^6 + A8s^8 + A10s^{10} \quad (9)$$

The following are various parameters (Table 2) for the surfaces represented by the surface numbers 2, 3, 5, and 6. No. means surface number.

TABLE 2

| No. | k | A2 | A4 | A6 | A8 | A10 |
|---|---|---|---|---|---|---|
| 2 | 0 | −5.595E−02 | −1.919E−04 | −5.873E−07 | 9.131E−09 | 0.000E+00 |
| 3 | 0 | 3.013E−02 | −1.725E−04 | 1.212E−06 | −3.270E−09 | 3.161E−12 |
| 5 | 0 | −5.486E−02 | 5.915E−05 | −2.540E−07 | 6.040E−10 | −4.992E−13 |
| 6 | 0 | 3.701E−02 | −3.346E−05 | 9.414E−08 | −1.177E−10 | 2.314E−14 |

The diagonal length of the display plane DP of the display panel DE is 19 mm, the maximum field angle FV is 80 degrees, the distance FB between the effective rear focal point XP and the eyepiece EP is 20.25 mm, and the focal length FL of the eyepiece EP is 17.092 mm. Thus, the conditions that the diagonal length of the display plane DP not be greater than 40 mm, the maximum field angle of the eyepiece EP be greater than 80 degrees, the distance FB not be less than 15 mm, and the focal length FL not be greater than 25 mm are satisfied. With respect to the optical surface S2 that is a Fresnel surface of the second element E2 and the optical surface S3 that is a Fresnel surface of the third element E3, the distance on the optical axis of the eyepiece EP between the optical surface S2 (surface number 5) situated closer to the side of the display panel DE and the optical surface S3 (surface number 6) situated closer to the side of the positive direction is 0.6 mm. Thus, the condition that the distance on the optical axis of the eyepiece EP between one of the surfaces that is situated closest to the side of the display panel DE and another one of the surfaces that is situated closest to the side of the positive direction be one third of the focal length FL of the eyepiece EP or less is also satisfied.

The curvature of a connected surface formed by virtually connecting optical surfaces that are concentrically arranged in a Fresnel surface and the curvature of an aspherical surface are obtained using Expression (10) below, and the value in Expression (10) is calculated by substituting z'(s) in Expression (11) and z''(s) in Expression (12), where the sag Z is differentiated with respect to the distance s from the optical axis in Expression (11) and Expression (12).

$$q(s) = \frac{z''(s)}{\left(\sqrt{1+Z'(s)^2}\right)^3} \quad (10)$$

$$Z'(s) = \frac{Cs}{\sqrt{1-C^2(1+k)s^2}} + 2A_2s + 4A_4s^3 + 6A_6s^5 + 8A_8s^7 + 10A_{10}s^9 \quad (11)$$

$$Z''(s) = \frac{C}{\sqrt{(1-C^2(1+k)s^2))^3}} + \quad (12)$$
$$2A_2 + 12A_4s^3 + 30A_6s^4 + 56A_8s^6 + 90A_{10}s^8$$

Figure 9:
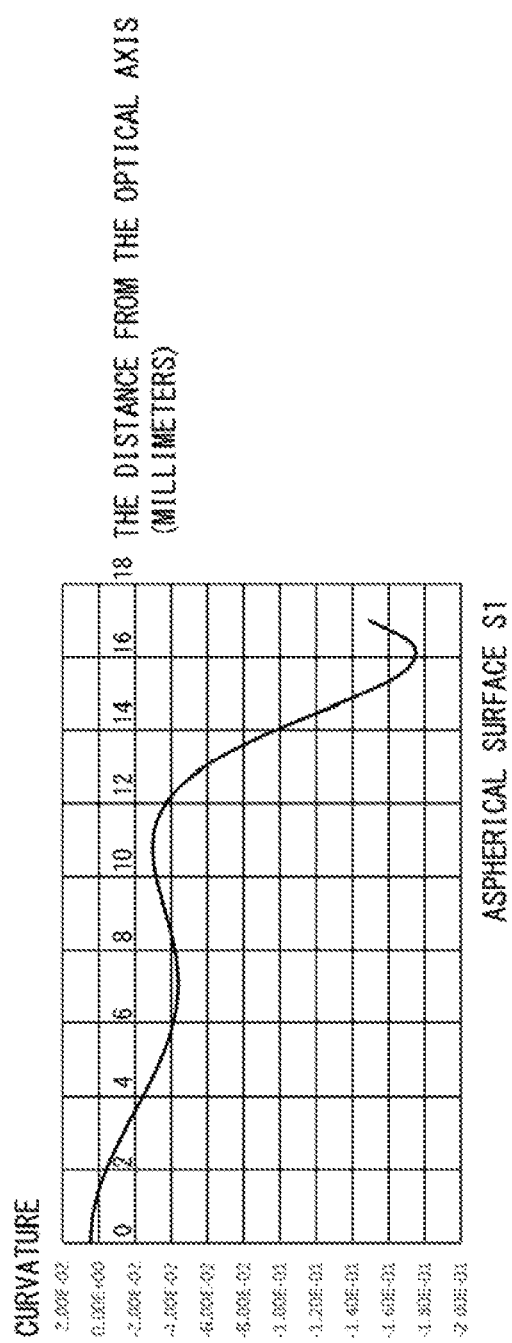
FIG. 9 is a graph of a curvature of a second optical surface.
Figure 10:
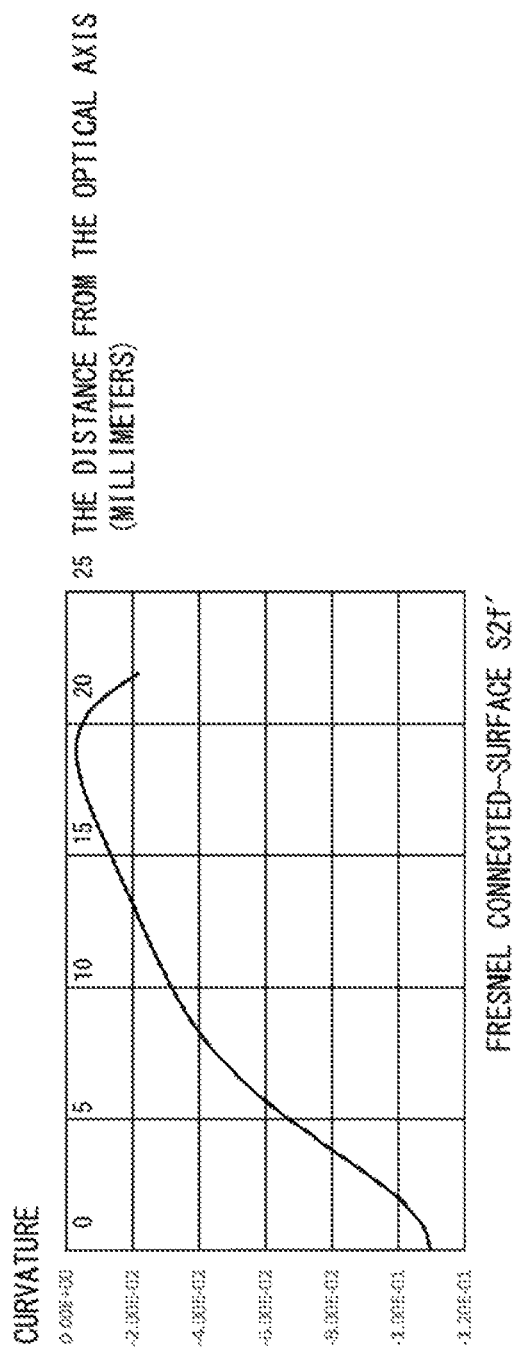
FIG. 10 is a graph of a curvature of a connected surface in a Fresnel surface of a second element.
Figure 11:
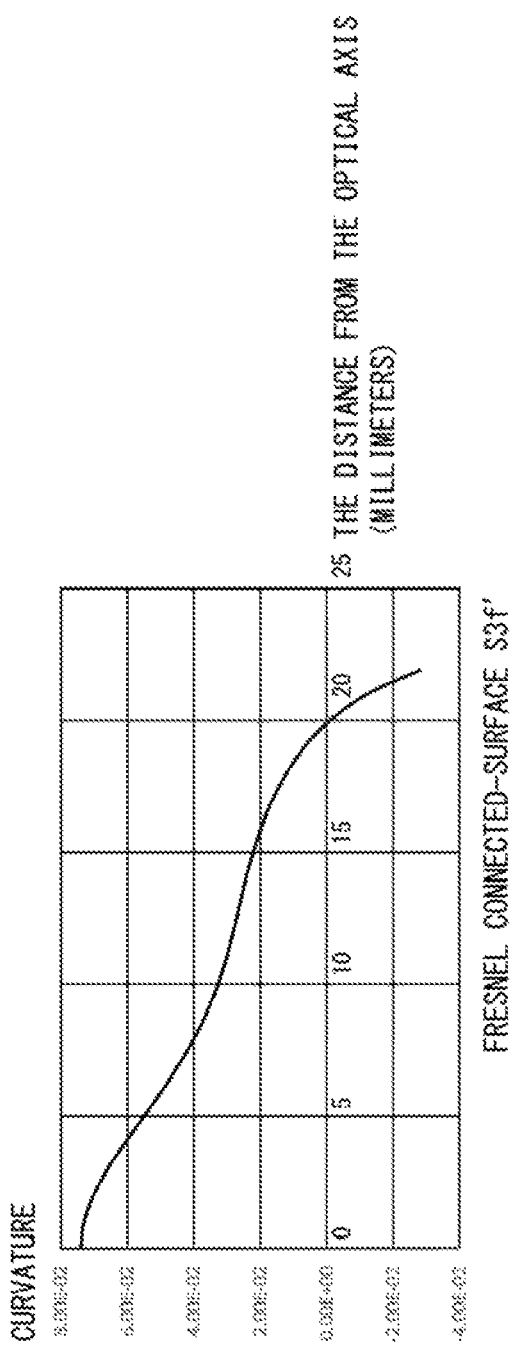
FIG. 11 is a graph of a curvature of a connected surface in a Fresnel surface of a third element.

The curvatures of the optical surfaces S0 and S1 are obtained by substituting the data for the surface numbers 2 and 3 described above, and graphs of these curvatures in FIGS. 8 and 9 are respectively created. With respect to the optical surfaces S2 and S3 that are Fresnel surfaces, the curvatures of the connected surfaces described in FIGS. 5 and 6 (the connected surface S2f and the connected surface S3f, respectively) are obtained by substituting the data for the surface numbers 5 and 6, and graphs of these curvatures in FIGS. 10 and 11 are respectively created, each connected surface being formed by virtually connecting optical surfaces that are concentrically arranged in the respective Fresnel surface.

Figure 8:
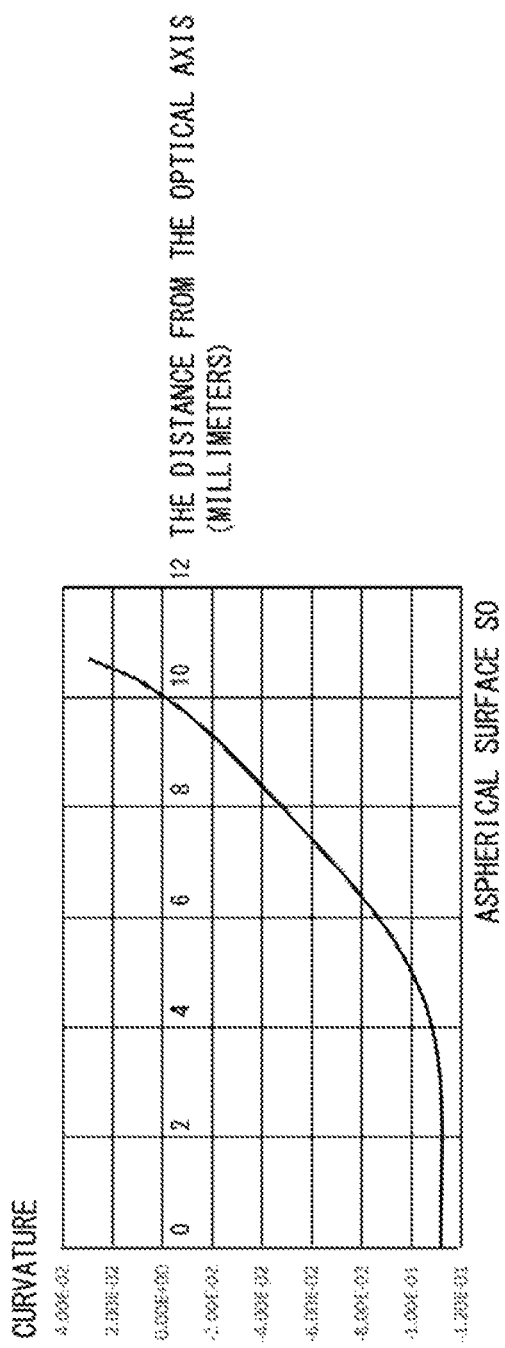
FIG. 8 is a graph of a curvature of a first optical surface.
Figure 12:
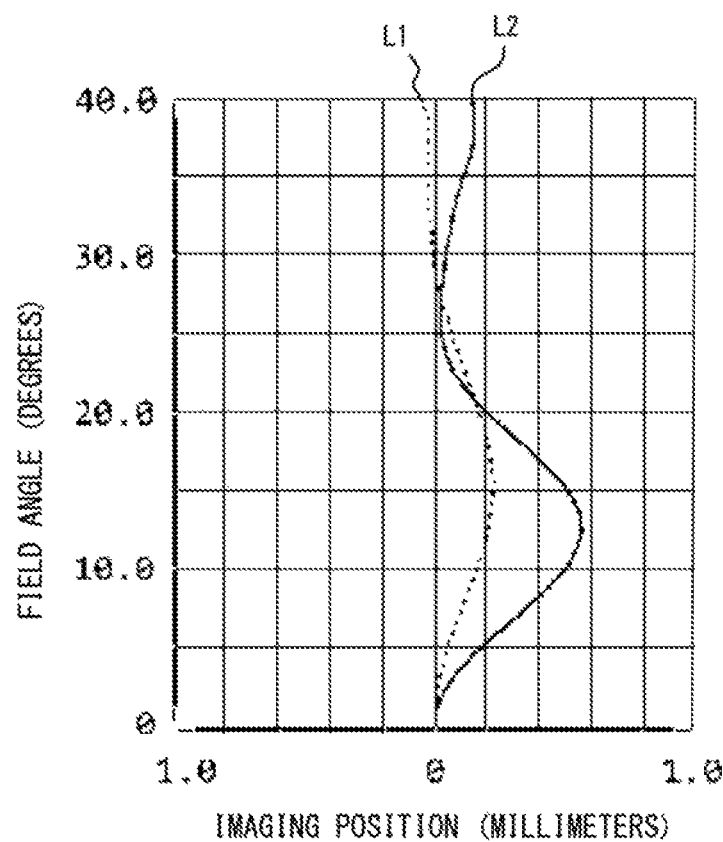
FIG. 12 is a graph that illustrates an imaging performance of the eyepiece.
Figure 13:
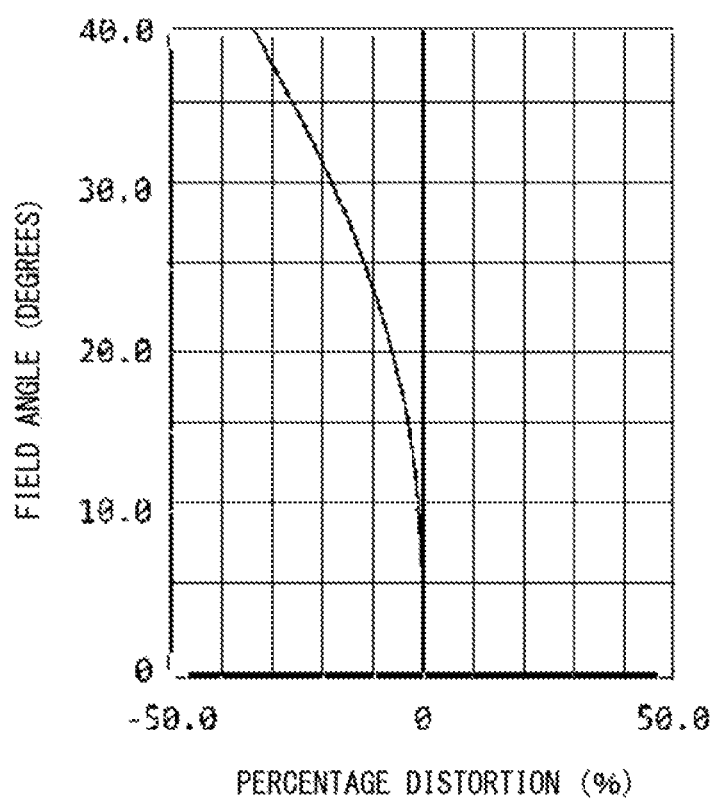
FIG. 13 is another graph that illustrates the imaging performance of the eyepiece.

As illustrated in FIG. 8, the entire optical surface S0 has a negative curvature except for its outer region. As illustrated in FIG. 9, the outer region of the optical surface S1 has a negative curvature and is convex toward the outside of the medium. As illustrated in FIG. 10, the connected surface S2f has a negative curvature on its optical-axis region, and the curvature varies in the positive direction from a point intersecting the optical axis to an outer region. As illustrated in FIG. 11, the connected surface S3f has a positive curvature on its optical-axis region, and the curvature varies in the positive direction from a point intersecting the optical axis to an outer region. FIGS. 12 and 13 illustrate an imaging performance of the eyepiece EP in the first example. For convenience, FIGS. 12 and 13 illustrate an imaging performance when a light ray is traced from a position of a virtual image created by the eyepiece EP to the display plane DP through the eyepiece EP, so as to perform imaging.

FIG. 12 is a graph of a field curvature in which the vertical axis represents a field angle (degrees) and the horizontal axis represents an imaging position (mm). The solid line represents a tangential field curvature and the broken line represents a sagittal field curvature. L1 represents a line that corresponds to a sagittal field curvature of a light ray of a wavelength of 0.588E-03 mm, and L2 represents a line that corresponds to a tangential field curvature of the light ray of a wavelength of 0.588E-03 mm.

FIG. 13 is a graph of a percentage distortion in which the vertical axis represents a field angle (degrees) and the horizontal axis represents a relative value of an image distortion that is obtained with a distance between the optical axis and an image without distortion (an ideal image height) used as a reference. Here, the relative value of an image distortion is calculated by subtracting the ideal image height from an actual image height and by dividing the obtained result by the ideal image height. FIG. 13 illustrates a curve that represents a percentage distortion of a light ray of a wavelength of 0.588E-0.3 mm.

Further, as illustrated in FIG. 13, the percentage distortion increases in the negative direction with an increase in field angle. In other words, a barrel distortion is present in an image that is formed on the display plane DP. As described above, FIG. 13 illustrates the case when a light ray is traced from a position of a virtual image created by the eyepiece EP. Thus, it can be said that an image exhibiting a pincushion-type distortion will be created when a light ray is conversely traced from the display plane DP through the eyepiece EP, and it is understood that the eyepiece EP forms a pincushion-type image distortion.

SECOND EXAMPLE

Figure 14:
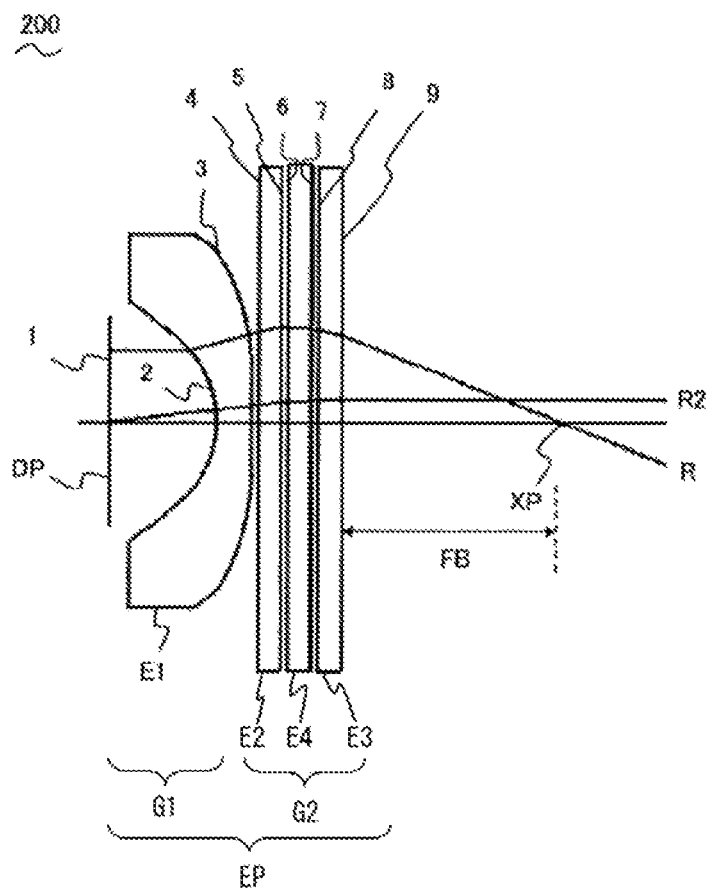
FIG. 14 illustrates a lens configuration of a video display device according to a second example.

FIG. 14 illustrates a lens configuration of a video display device 200 according to a second example. The eyepiece EP of the video display device 200 includes a first lens group G1 and a second lens group G2.

The first lens group G1 includes a first element E1 that is a refractive lens and that has an optical surface S0 on the side of the display plane DP and an optical surface S1 on the side of the positive direction, wherein the optical surface S0 has a negative refractive power, and the outer region of the optical surface S has a negative curvature and is convex toward the outside of a lens medium. The curvature of a surface of each element will be described in detail later.

The second lens group G2 includes a second element E2 that has a Fresnel surface (optical surface S2) facing the side of the positive direction, a fourth element E4 that has a DOE surface (optical surface S4) facing the side of the positive direction, and a third element E3 that has a Fresnel surface (optical surface S3) facing the side of the display plane DP.

The following is lens data according to the second example (Table 3).

TABLE 3

| Surface No. | R' | T | nd | vd | Effective Radius |
|---|---|---|---|---|---|
| 1 | ∞ | 9.39 | 1 | 0 | |
| 2 | ∞ | 3.1 | 1.534 | 56 | 11.4 |
| 3 | 18.3 | 0.6 | 1 | 0 | 17.1 |
| 4 | ∞ | 2 | 1.534 | 56 | 21.2 |
| 5 | ∞ | 0.6 | 1 | 0 | 22.0 |
| 6 | ∞ | 2 | 1.534 | 56 | 22.0 |
| 7 | ∞ | 0.6 | 1 | 0 | 21.9 |
| 8 | ∞ | 2 | 1.534 | 56 | 2.19 |
| 9 | ∞ | 19 | 1 | 0 | 21.1 |
| 10 | — | -1333 | 1 | 0 | |
| 11 | — | 0 | 1 | 0 | |

R' represents a radius of curvature (mm) on the optical axis of the eyepiece EP with respect to surface numbers 1, 4, 6, and 9, and represents a parameter for obtaining C in Expressions (8), (9), and (13) with respect to surface numbers 2, 3, 5, 7, and 8. T represents a surface interval (mm), nd represents a refractive index, and vd represents an Abbe number. The surface number 1 represents the display plane DP of the display panel DE. The surface numbers 2 to 9 represent optical surfaces that constitute the eyepiece EP. The surface number 2 corresponds to the optical surface S0. The surface number 3 corresponds to the optical surface S1. The surface number 5 corresponds to the optical surface S2. The surface number 7 corresponds to the optical surface S4. The surface number 8 corresponds to the optical surface S3. A surface number 10 represents a position of the pupil of the eye of a user. A surface number 11 represents a surface of a virtual image that is presented to the user.

Surfaces represented by the surface numbers 2 and 3 are aspherical surfaces, and their sags Z are defined using Expression (8) described above.

Surfaces represented by the surface numbers 5 and 8 are Fresnel surfaces, and the sag Z of a connected surface formed by virtually connecting optical surfaces that are concentrically arranged in the Fresnel surface (surface number 5, 8) is defined using Expression (9) described above.

The following are various parameters for the surfaces represented by the surface numbers 2, 3, 5, and 8. No. means surface number (Table 4).

TABLE 4

| No. | k | A2 | A4 | A6 | A8 | A10 |
|---|---|---|---|---|---|---|
| 2 | 0 | −4.650E−02 | −1.620E−04 | −1.970E−06 | 1.780E−08 | 0.000E+00 |
| 3 | 0 | 3.250E−02 | −1.890E−04 | 1.140E−06 | −2.620E−09 | 1.840E−12 |
| 5 | 0 | −5.120E−02 | 4.930E−05 | −2.120E−07 | 5.090E−10 | −4.310E−13 |
| 8 | 0 | 3.390E−02 | −2.540E−05 | 4.990E−08 | −2.770E−11 | −4.030E−14 |

A surface represented by the surface number 7 is a DOE surface, and a phase amount D that the DOE surface gives to light passing through the DOE surface is defined using Expression (13) below.

$$D(s) = \frac{m\lambda}{2\pi}\left\{\frac{Cs^2}{1+\sqrt{1-(1+k)C^2s^2}}\right\} + \\ A2s^2 + A4s^4 + A6s^6 + As^8 + As^{10} + \ldots \quad (13)$$

m is a diffraction order, $\lambda$ is a reference wavelength, k is a constant, and A2, A4, . . . are constants that are parameters for the respective orders, where the constants A4 and after A4 are zero.

The following are various parameters for a surface represented by the surface number 7 (Table 5).

TABLE 5

| Surface No. | k | A2 | Diffraction Order m | Reference Wavelength $\lambda$ (mm) |
|---|---|---|---|---|
| 7 | 0 | −25.3 | 1 | 0.533 × 10−3 |

The diagonal length of the display plane DP of the display panel DE is 19.8 mm (the diagonal length of the display panel DE is 25.4 mm), the maximum field angle FV is 90 degrees, the distance FB between the effective rear focal point XP and the eyepiece EP is 18.8 mm, and the focal length FL of the eyepiece EP is 17.1 mm. Thus, the conditions that the diagonal length of the display plane DP not be greater than 40 mm, the maximum field angle of the eyepiece EP be greater than 80 degrees, the distance FB not be less than 15 mm, and the focal length FL not be greater than 25 mm are satisfied. With respect to the optical surface S2 that is a Fresnel surface of the second element E2, the optical surface S3 that is a Fresnel surface of the third element E3, and the DOE surface, the distance on the optical axis of the eyepiece EP between the optical surface S2 (surface number 5) situated closest to the side of the display panel DE and the optical surface S3 (surface number 8) situated closest to the side of the positive direction is 3.2 mm, the optical surface S2 and the optical surface S3 being situated opposite to each other across the optical surface S4 (surface number 7) that is a DOE surface. Thus, the condition that the distance on the optical axis of the eyepiece EP between one of the surfaces that is situated closest to the side of the display panel DE and another one of the surfaces that is situated closest to the side of the positive direction be one third of the focal length FL of the eyepiece EP or less is also satisfied.

The curvature of a connected surface formed by virtually connecting optical surfaces that are concentrically arranged in a Fresnel surface and the curvature of an aspherical surface are obtained using Expression (10) described above, and the value in Expression (10) is calculated by substituting z′(s) in Expression (11) and z′(s) in Expression (12), where the sag Z is differentiated with respect to the distance s from the optical axis in Expression (11) and Expression (12).

Figure 16:
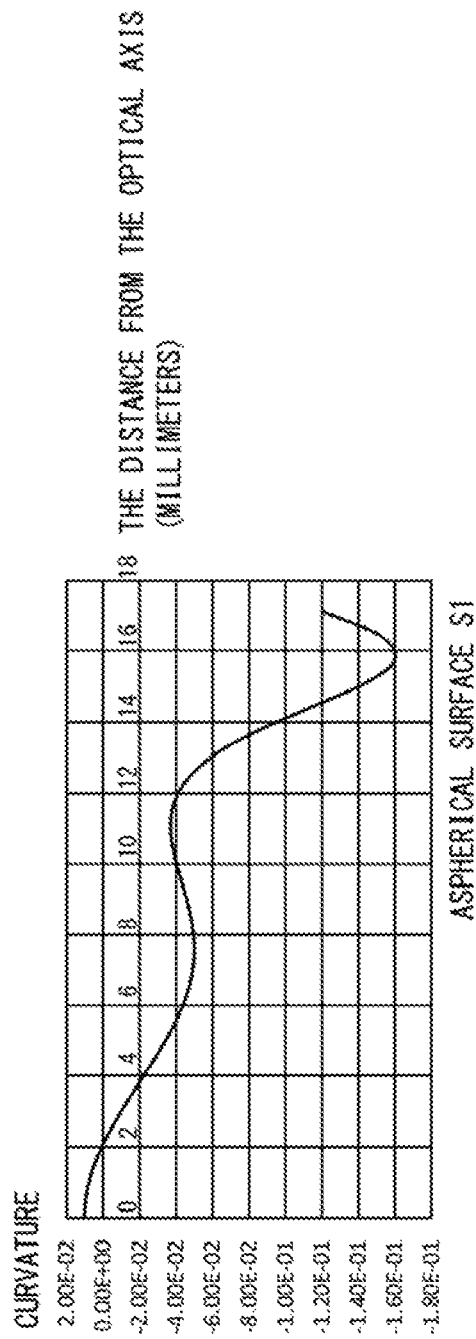
FIG. 16 is a graph of a curvature of a second optical surface.
Figure 17:
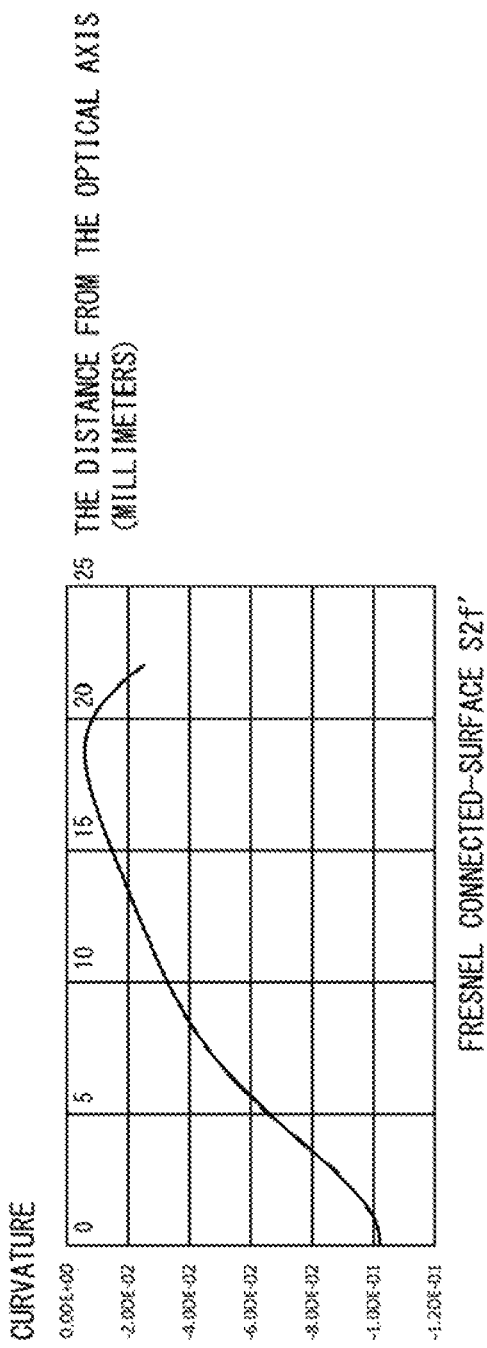
FIG. 17 is a graph of a curvature of a connected surface in a Fresnel surface of a second element.
Figure 18:
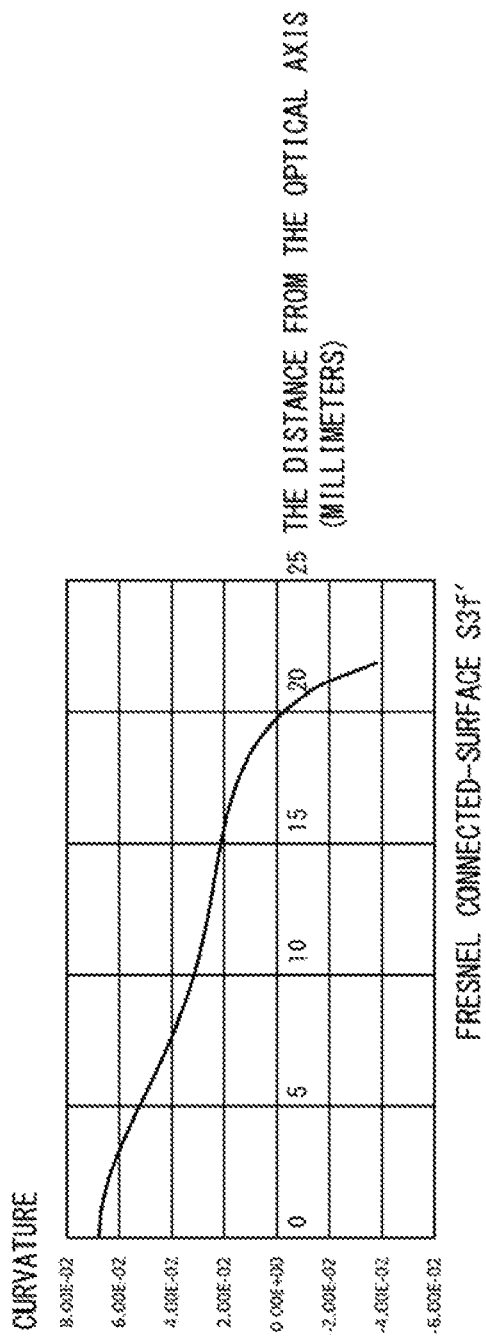
FIG. 18 is a graph of a curvature of a connected surface in a Fresnel surface of a third element.

The curvatures of the optical surfaces S0 and S1 are obtained by substituting the data for the surface numbers 2 and 3 described above, and graphs of these curvatures in FIGS. 15 and 16 are respectively created. With respect to the optical surfaces S2 and S3 that are Fresnel surfaces, the curvatures of the connected surfaces described in FIGS. 5 and 6 (the connected surface S2f and the connected surface S3f′, respectively) are obtained by substituting the data for the surface numbers 5 and 8, and graphs of these curvatures in FIGS. 17 and 18 are respectively created, each connected surface being formed by virtually connecting optical surfaces that are concentrically arranged in the respective Fresnel surface.

Figure 15:
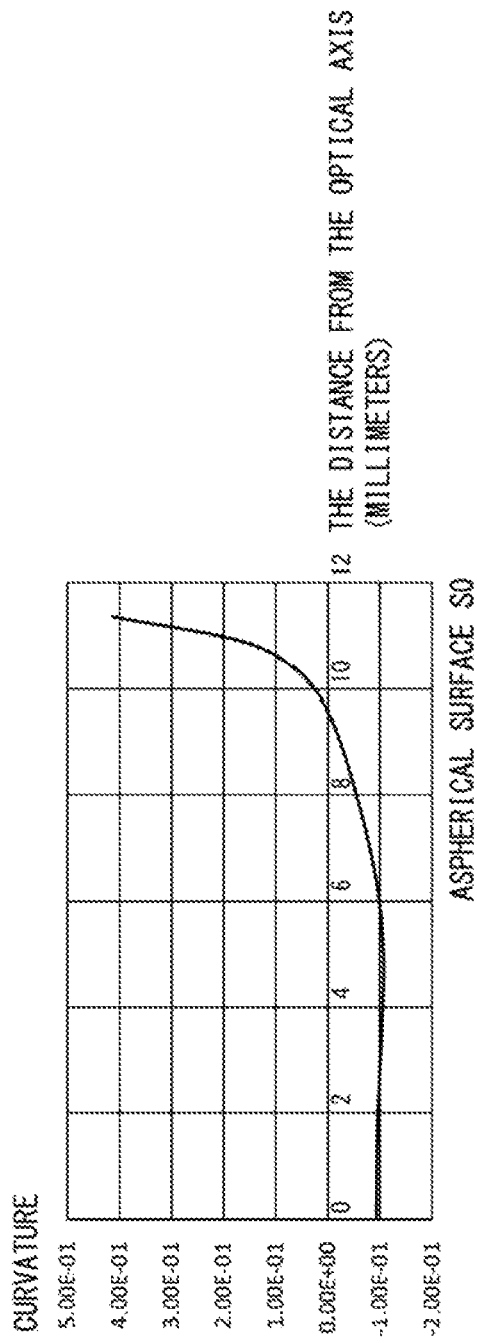
FIG. 15 is a graph of a curvature of a first optical surface.

As illustrated in FIG. 15, the entire optical surface S0 has a negative curvature except for its outer region. As illustrated in FIG. 16, the outer region of the optical surface S1 has a negative curvature and is convex toward the outside of the medium. As illustrated in FIG. 17, the connected surface S2f′ has a negative curvature on its optical-axis region, and the curvature varies in the positive direction from a point intersecting the optical axis to an outer region. As illustrated in FIG. 18, the connected surface S3′ has a positive curvature on its optical-axis region, and the curvature varies in the positive direction from a point intersecting the optical axis to an outer region.

With respect to the phase amount defined in Expression (13), the refractive power of the DOE surface is calculated using Expression (14) below.

$$P = -(m\lambda/2\pi)\cdot(C+2\cdot A2) \quad (14)$$

The refractive power P4 of the optical surface S4 that is a DOE surface is calculated as below, using Expression (14) described above.

$$P4 = 4.29 \times 10^{-3} \quad (15)$$

The refractive power P4 defined by Expression (15), P0 (=1/FL), and V0 (=(V2+V3)/2) satisfy Expression (5).

Figure 19:
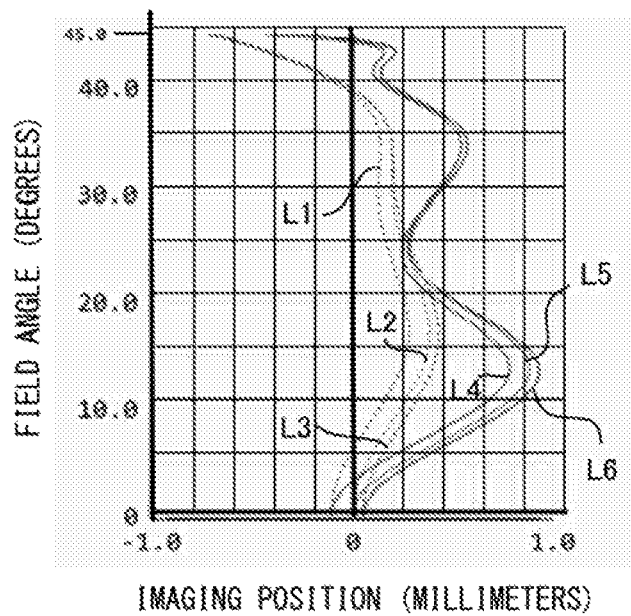
FIG. 19 is a graph that illustrates an imaging performance of the eyepiece.
Figure 20:
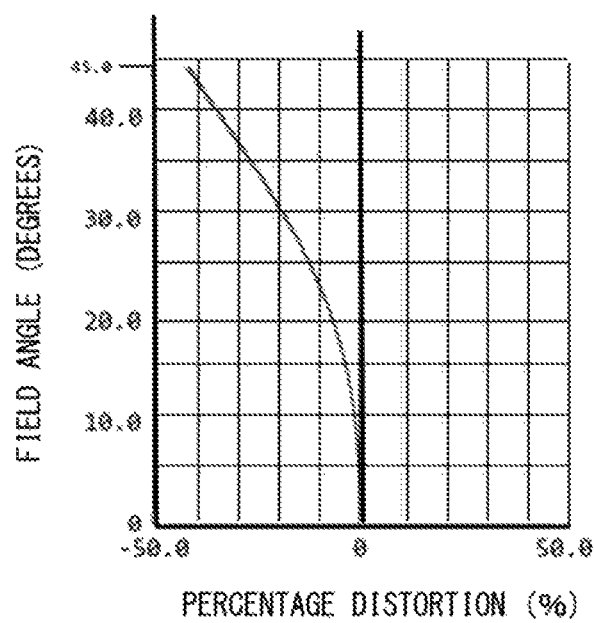
FIG. 20 is another graph that illustrates the imaging performance of the eyepiece.

Further, FIGS. 19 and 20 illustrate an imaging performance of the eyepiece EP in the second example. For convenience, FIGS. 19 and 20 illustrate an imaging performance when a light ray is traced from a position of a virtual image created by the eyepiece EP to the display plane DP through the eyepiece EP, so as to perform imaging.

FIG. 19 is a graph of a field curvature, in which the vertical axis represents a field angle (degrees) and the horizontal axis represents an imaging position (mm). The solid line represents a tangential field curvature and the broken line represents a sagittal field curvature. L1 represents a line that corresponds to a sagittal field curvature of a light ray of a wavelength of 0.656E-03 mm, and L4 represents a line that corresponds to a tangential field curvature of the light ray of a wavelength of 0.656E-03 mm. L2 represents a line that corresponds to a sagittal field curvature of a light ray of a wavelength of 0.588E-03 mm, and L5 represents a line that corresponds to a tangential field curvature of the light ray of a wavelength of 0.588E-03 mm. L3 represents a line that corresponds to a sagittal field curvature of a light ray of a wavelength of 0.486E-03 mm, and L6 represents a line that corresponds to a tangential field curvature of the light ray of a wavelength of 0.486E-03 mm.

As illustrated in FIG. 19, both of the imaging positions of the tangential image surface and the sagittal image surface remain substantially unchanged, so the axial chromatic aberration that occurs in the eyepiece EP is favorably corrected.

FIG. 20 is a graph of a percentage distortion in which the vertical axis represents a field angle (degrees) and the horizontal axis represents a relative value of an image distortion that is obtained with a distance between the optical axis and an image without distortion (an ideal image height) used as a reference. Here, the relative value of an image distortion is calculated by subtracting the ideal image height from an actual image height and by dividing the obtained result by the ideal image height.

FIG. 20 illustrates curves that represent percentage distortions of the light rays of wavelengths of 0.486E-03 mm, 0.588E-03 mm, and 0.656E-03 mm, respectively, and the curves overlap one another, which makes them look as if they were almost one curve. Thus, the lateral chromatic aberration that occurs in the eyepiece EP is favorably corrected.

Further, as illustrated in FIG. 20, the percentage distortions increase in the negative direction with an increase in field angle. In other words, a barrel distortion is present in an image that is formed on the display plane DP. As described above, FIG. 20 illustrates the case when a light ray is traced from a position of a virtual image created by the eyepiece EP. Thus, it can be said that an image exhibiting a pincushion-type distortion will be created when a light ray is conversely traced from the display plane DP through the eyepiece EP, and it is understood that the eyepiece EP forms a pincushion-type image distortion.

THIRD EXAMPLE

Figure 21:
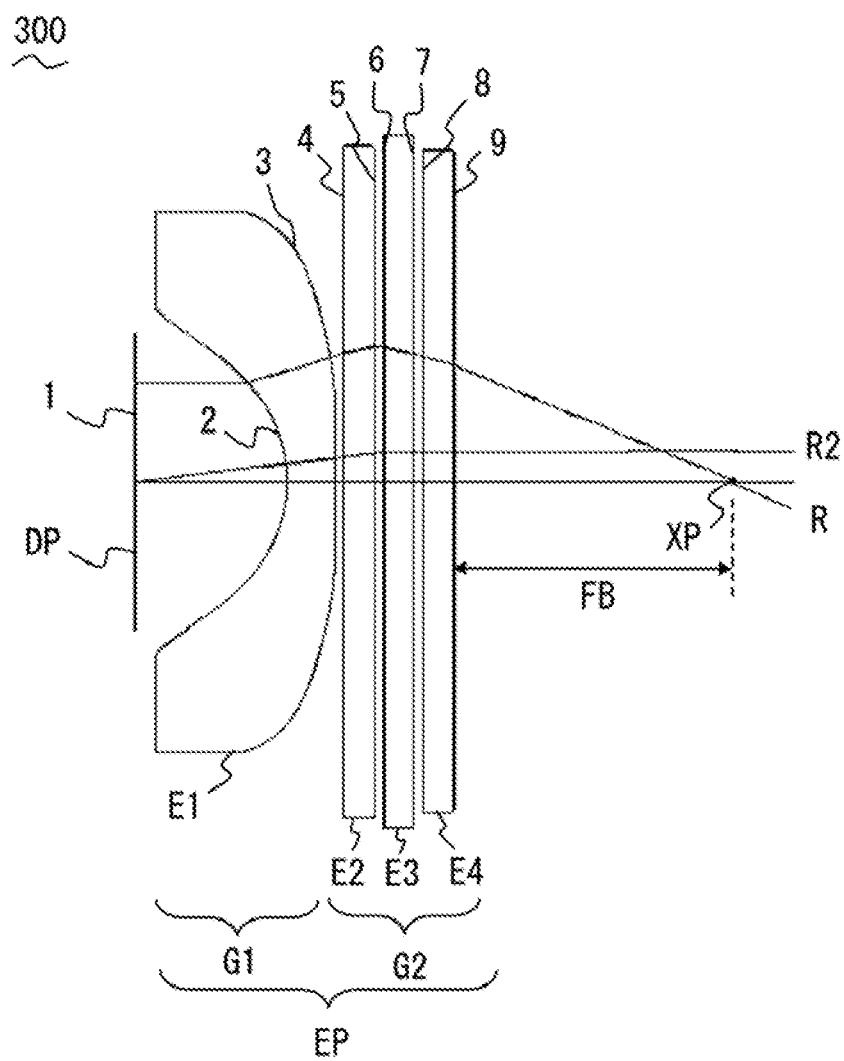
FIG. 21 illustrates a lens configuration of a video display device according to a third example.

FIG. 21 illustrates a lens configuration of a video display device 300 according to a third example. The eyepiece EP of the video display device 300 includes a first lens group G1 and a second lens group G2.

The first lens group G1 includes a first element E1 that is a refractive lens and that has an optical surface S0 on the side of the display plane DP and an optical surface S1 on the side of the positive direction, wherein the optical surface S0 has a negative refractive power, and the outer region of the optical surface S1 has a negative curvature and is convex toward the outside of a lens medium. The curvature of a surface of each element will be described in detail later.

The second lens group G2 includes a second element E2 that has a Fresnel surface (optical surface S2) facing the side of the positive direction, a third element E3 that has a Fresnel surface (optical surface S3) facing the side of the display plane DP, and a fourth element E4 that has a DOE surface (optical surface S4) facing the side of the display plane DP.

The following is lens data according to the third example (Table 6).

TABLE 6

| Surface No. | R' | T | nd | vd | Effective Radius |
|---|---|---|---|---|---|
| 1 | ∞ | 9.98 | 1 | 0 | |
| 2 | ∞ | 3.1 | 1.534 | 56 | 11.4 |
| 3 | −18.301 | 0.6 | 1 | 0 | 17.8 |
| 4 | ∞ | 2 | 1.534 | 56 | 22.2 |
| 5 | ∞ | 0.6 | 1 | 0 | 23.0 |
| 6 | ∞ | 2 | 1.534 | 56 | 22.8 |
| 7 | ∞ | 0.6 | 1 | 0 | 22.2 |
| 8 | ∞ | 2 | 1.534 | 56 | 21.9 |
| 9 | ∞ | 18.46 | 1 | 0 | 21.1 |
| 10 | — | −1333 | 1 | 0 | |
| 11 | — | 0 | 1 | 0 | |

R' represents a radius of curvature (mm) on the optical axis of the eyepiece EP with respect to surface numbers 1, 4, 7, and 9, and represents a parameter for obtaining C in Expressions (8), (9), and (13) with respect to surface numbers 2, 3, 5, 6, and 8. T represents a surface interval (mm), nd represents a refractive index, and vd represents an Abbe number. The surface number 1 represents the display plane DP of the display panel DE. The surface numbers 2 to 9 represent optical surfaces that constitute the eyepiece EP. The surface number 2 corresponds to the optical surface S0. The surface number 3 corresponds to the optical surface S1. The surface number 5 corresponds to the optical surface S2. The surface number 6 corresponds to the optical surface S3. The surface number 8 corresponds to the optical surface S4. A surface number 10 represents a position of the pupil of the eye of a user. A surface number 11 represents a surface of a virtual image that is presented to the user.

Surfaces represented by the surface numbers 2 and 3 are aspherical surfaces, and their sags Z are defined using Expression (8) described above.

Surfaces represented by the surface numbers 5 and 6 are Fresnel surfaces, and the sag Z of a connected surface formed by virtually connecting optical surfaces that are concentrically arranged in the Fresnel surface (surface number 5, 6) is defined using Expression (9) described above.

The following are various parameters for the surfaces represented by the surface numbers 2, 3, 5, and 6. No. means surface number (Table 7).

TABLE 7

| No. | k | A2 | A4 | A6 | A8 | A10 |
|---|---|---|---|---|---|---|
| 2 | 0 | −5.274E−02 | −1.513E−04 | −1.818E−06 | 1.682E−08 | 0.000E+00 |
| 3 | 0 | 3.172E−02 | −1.661E−04 | 1.057E−06 | −2.640E−09 | 2.416E−12 |
| 5 | 0 | −5.328E−02 | 4.926E−05 | −2.143E−07 | 5.123E−10 | −4.088E−13 |
| 6 | 0 | 3.483E−02 | −3.294E−05 | 5.835E−08 | −3.332E−11 | −2.879E−14 |

A surface represented by the surface number 8 is a DOE surface, and a phase amount D that the DOE surface gives to light passing through the DOE surface is defined using Expression (13) described above.

The following are various parameters for a surface represented by the surface number 8 (Table 8).

TABLE 8

| Surface No. | k | A2 | Diffraction Order m | Reference Wavelength λ, (mm) |
|---|---|---|---|---|
| 8 | 0 | −2.21E+01 | 1 | 0.533E−03 |

The diagonal length of the display plane DP of the display panel DE is 19.9 mm, the maximum field angle FV is 90 degrees, the distance FB between the effective rear focal point XP and the eyepiece EP is 18.46 mm, and the focal length FL of the eyepiece EP is 17.13 mm. Thus, the conditions that the diagonal length of the display plane DP not be greater than 40 mm, the maximum field angle of the eyepiece EP be greater than 80 degrees, the distance FB not be less than 15 mm, and the focal length FL not be greater than 25 mm are satisfied. With respect to the optical surface S2 that is a Fresnel surface of the second element E2, the optical surface S3 that is a Fresnel surface of the third element E3, and the DOE surface, the distance on the optical axis of the eyepiece EP between the optical surface S2 (surface number 5) situated closest to the side of the display panel DE and the optical surface S4 (surface number 8) that is a DOE surface and is situated closest to the side of the positive direction is 3.2 mm, the optical surface S2 and the optical surface S4 being situated opposite to each other across the optical surface S3. Thus, the condition that the distance on the optical axis of the eyepiece EP between one of the surfaces that is situated closest to the side of the display panel DE and another one of the surfaces that is situated closest to the side of the positive direction be one third of the focal length FL of the eyepiece EP or less is also satisfied.

The curvature of a connected surface formed by virtually connecting optical surfaces that are concentrically arranged in a Fresnel surface and the curvature of an aspherical surface are obtained using Expression (10) described above, and the value in Expression (10) is calculated by substituting z'(s) in Expression (11) and z''(s) in Expression (12), where the sag Z is differentiated with respect to the distance s from the optical axis in Expression (11) and Expression (12).

Figure 23:
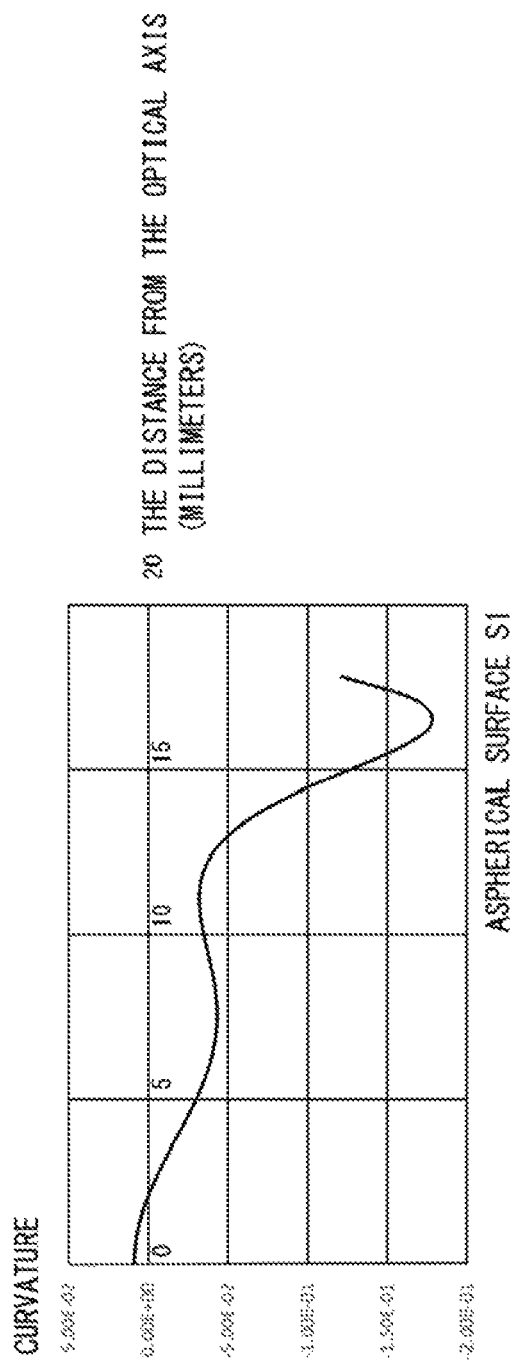
FIG. 23 is a graph of a curvature of a second optical surface.
Figure 24:
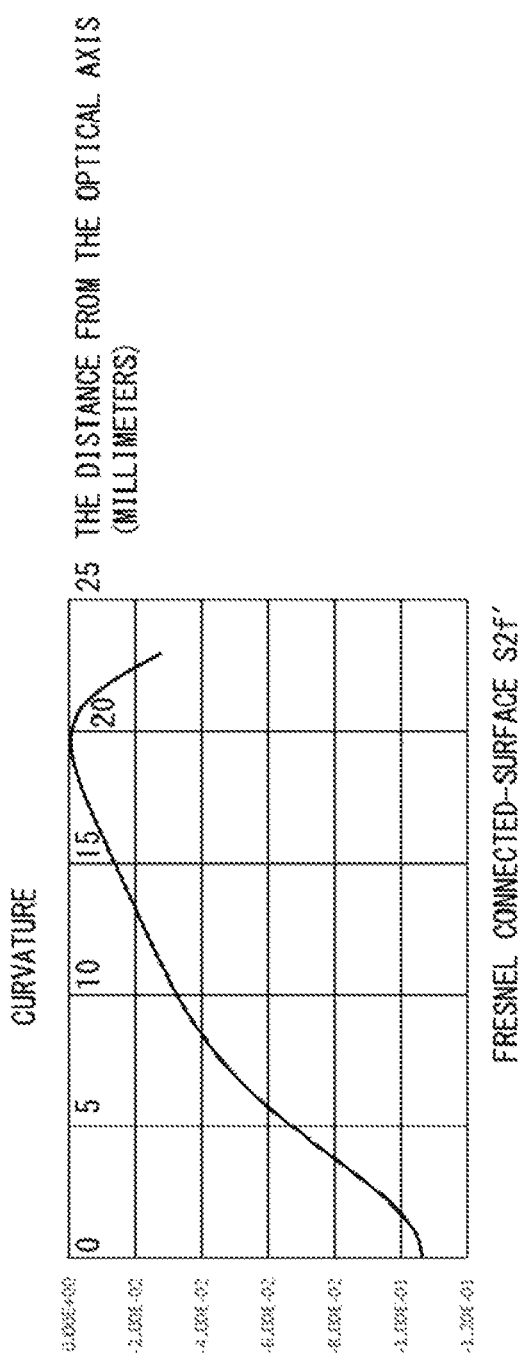
FIG. 24 is a graph of a curvature of a connected surface in a Fresnel surface of a second element.
Figure 25:
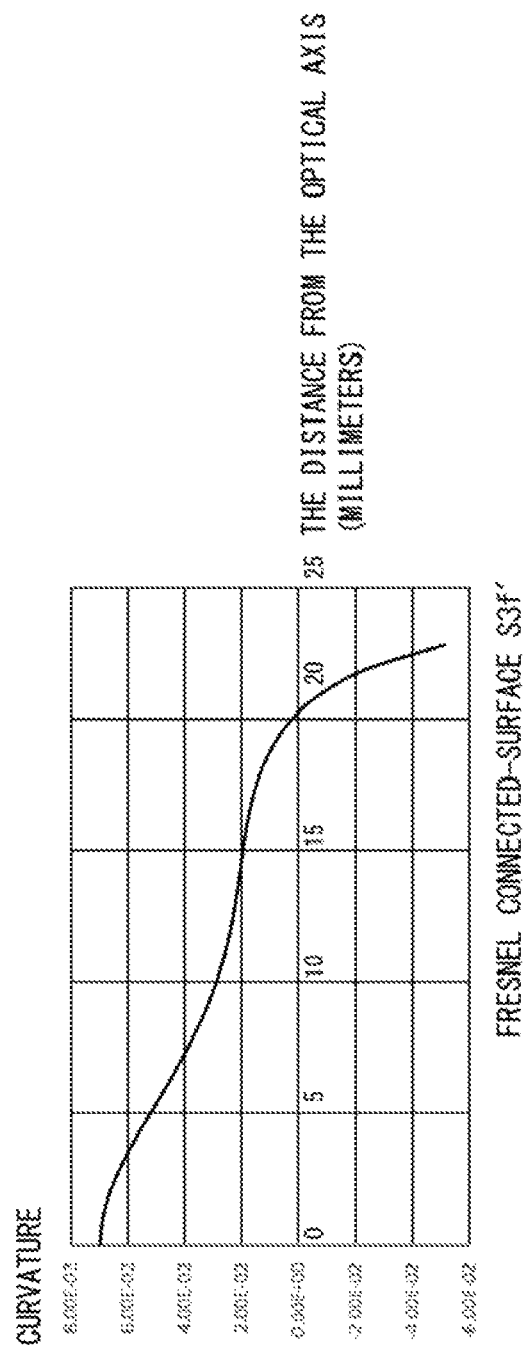
FIG. 25 is a graph of a curvature of a connected surface in a Fresnel surface of a third element.

The curvatures of the optical surfaces S0 and S1 are obtained by substituting the data for the surface numbers 2 and 3 described above, and graphs of these curvatures in FIGS. 22 and 23 are respectively created. With respect to the optical surfaces S2 and S3 that are Fresnel surfaces, the curvatures of the connected surfaces described in FIGS. 5 and 6 (the connected surface S2f and the connected surface S3f, respectively) are obtained by substituting the data for the surface numbers 5 and 6, and graphs of these curvatures in FIGS. 24 and 25 are respectively created, each connected surface being formed by virtually connecting optical surfaces that are concentrically arranged in the respective Fresnel surface.

Figure 22:
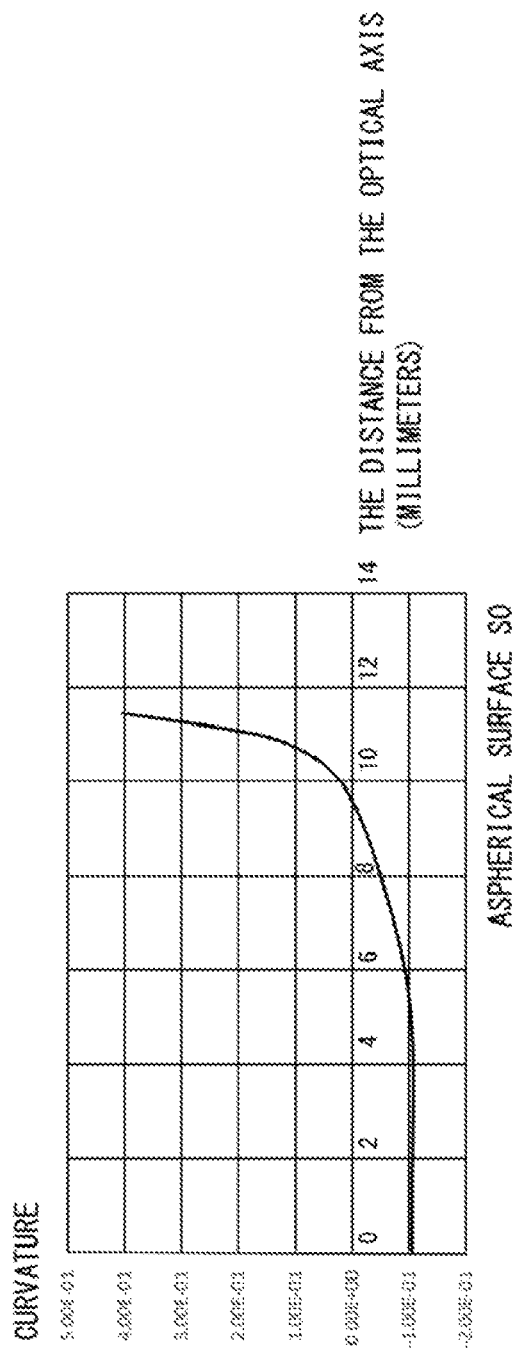
FIG. 22 is a graph of a curvature of a first optical surface.

As illustrated in FIG. 22, the entire optical surface S0 has a negative curvature except for its outer region. As illustrated in FIG. 23, the outer region of the optical surface S1 has a negative curvature and is convex toward the outside of the medium. As illustrated in FIG. 24, the connected surface S2f has a negative curvature on its optical-axis region, and the curvature varies in the positive direction from a point intersecting the optical axis to an outer region. As illustrated in FIG. 25, the connected surface S3f has a positive curvature on its optical-axis region, and the curvature varies in the positive direction from a point intersecting the optical axis to an outer region.

The refractive power P4 of the optical surface S4 that is a DOE surface is calculated as below, using Expression (14) described above.

$$P4 = 3.8 \times 10^{-3} \quad (16)$$

The refractive power P4 defined by Expression (16), P0 (=1/FL), and V0 (=(V2+V3)/2) satisfy Expression (5).

Figure 26:
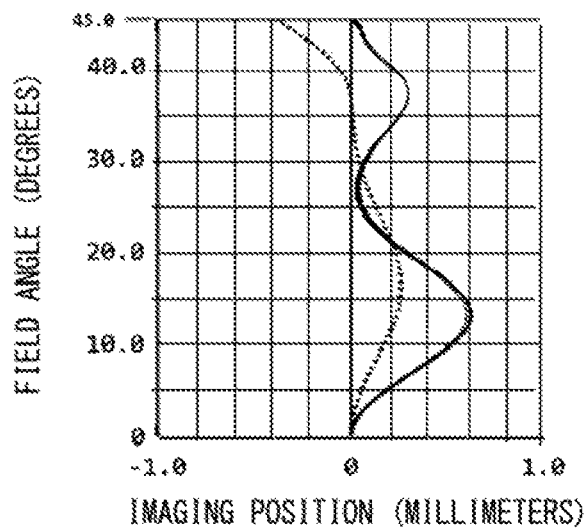
FIG. 26 is a graph that illustrates an imaging performance of the eyepiece.

Further, FIGS. 26 and 27 illustrate an imaging performance of the eyepiece EP in the third example. For convenience, FIGS. 26 and 27 illustrate an imaging performance when a light ray is traced from a position of a virtual image created by the eyepiece EP to the display plane DP through the eyepiece EP, so as to perform imaging.

FIG. 26 is a graph of a field curvature in which the vertical axis represents a field angle (degrees) and the horizontal axis represents an imaging position (mm). The solid line represents a tangential field curvature and the broken line represents a sagittal field curvature. The graph depicts a tangential field curvature and a sagittal field curvature of a light ray of a wavelength of 0.656E-03 mm, a tangential field curvature and a sagittal field curvature of a light ray of a wavelength of 0.588E-03 mm, and a tangential field curvature and a sagittal field curvature of a light ray of a wavelength of 0.486E-03 mm. The tangential field curvatures overlap one another, which makes them look as if they were almost one curve. The sagittal field curvatures overlap one another, which makes them look as if they were almost one curve. In other words, both of the imaging positions of the tangential image surface and the sagittal image surface remain substantially unchanged. Thus, the axial chromatic aberration that occurs in the eyepiece EP is favorably corrected.

FIG. 27 is a graph of a percentage distortion in which the vertical axis represents a field angle (degrees) and the horizontal axis represents a relative value of an image distortion that is obtained with a distance between the optical axis and an image without distortion (an ideal image height) used as a reference. Here, the relative value of an image distortion is calculated by subtracting the ideal image height from an actual image height and by dividing the obtained result by the ideal image height.

FIG. 27 illustrates curves that represent percentage distortions of the light rays of wavelengths of 0.486E-03 mm, 0.588E-03 mm, and 0.656E-03 mm, respectively, and the curves overlap one another, which makes them look as if they were almost one curve. Thus, the lateral chromatic aberration that occurs in the eyepiece EP is favorably corrected.

Further, as illustrated in FIG. 27, the percentage distortions increase in the negative direction with an increase in field angle. In other words, a barrel distortion is present in an image that is formed on the display plane DP. As described above, FIG. 27 illustrates the case when a light ray is traced from a position of a virtual image created by the eyepiece EP. Thus, it can be said that an image exhibiting a pincushion-type distortion will be created when a light ray is conversely traced from the display plane DP through the eyepiece EP, and it is understood that the eyepiece EP forms a pincushion-type image distortion.

FOURTH EXAMPLE

Figure 28:
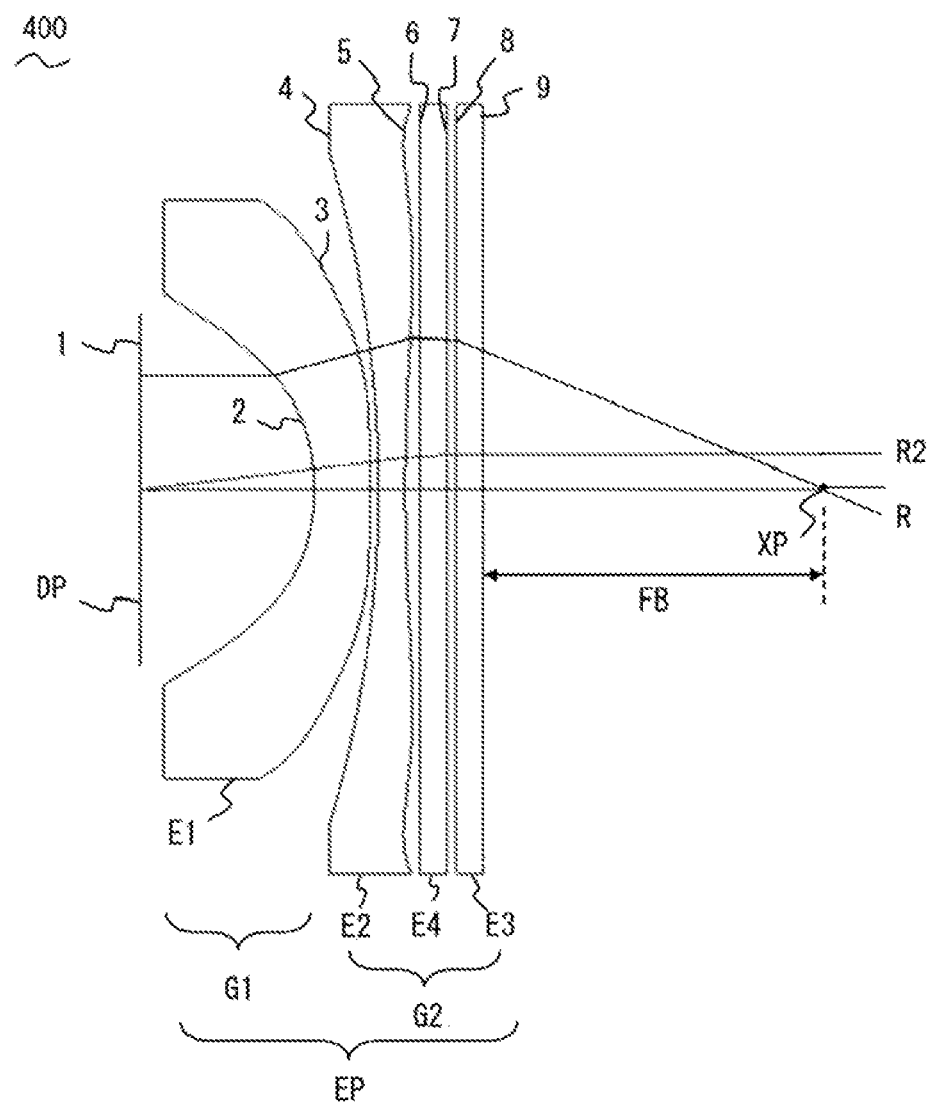
FIG. 28 illustrates a lens configuration of a video display device according to a fourth example.

FIG. 28 illustrates a lens configuration of a video display device 400 according to a fourth example. The eyepiece EP of the video display device 400 includes a first lens group G1 and a second lens group G2.

The first lens group G1 includes a first element E1 that is a refractive lens and that has an optical surface S0 on the side of the display plane DP and an optical surface S1 on the side of the positive direction, wherein the optical surface S0 has a negative refractive power, and the outer region of the optical surface S1 has a negative curvature and is convex toward the outside of a lens medium. The curvature of a surface of each element will be described in detail later.

The second lens group G2 includes a second element E2 that has a Fresnel surface (optical surface S2) facing the side of the positive direction, a fourth element E4 that has a DOE surface (optical surface S4) facing the side of the positive direction, and a third element E3 that has a Fresnel surface (optical surface S3) facing the side of the display plane DP.

The following is lens data according to the fourth example (Table 9).

TABLE 9

| Surface No. | R' | T | nd | vd | Effective Radius |
|---|---|---|---|---|---|
| 1 | ∞ | 9.79 | 1 | 0 | |
| 2 | ∞ | 3.1 | 1.534 | 56 | 11.0 |
| 3 | −18.3 | 0.5 | 1 | 0 | 16.3 |
| 4 | −66.6 | 1.5 | 1.534 | 56 | 19.1 |
| 5 | 105 | 0.88 | 1 | 0 | 21.7 |
| 6 | ∞ | 1.5 | 1.534 | 56 | 21.7 |
| 7 | ∞ | 0.5 | 1 | 0 | 21.7 |
| 8 | ∞ | 1.5 | 1.534 | 56 | 21.7 |
| 9 | ∞ | 19 | 1 | 0 | 21.7 |
| 10 | — | −1000 | 1 | 0 | |
| 11 | — | 0 | 1 | 0 | |

R' represents a radius of curvature (mm) on the optical axis of the eyepiece EP with respect to surface numbers 1, 4, 6, and 9, and represents a parameter for obtaining C in Expressions (8), (9), and (13) with respect to surface numbers 2, 3, 5, 7, and 8. T represents a surface interval (mm), nd represents a refractive index, and vd represents an Abbe number. The surface number 1 represents the display plane DP of the display panel DE. The surface numbers 2 to 9 represent optical surfaces that constitute the eyepiece EP. The surface number 2 corresponds to the optical surface S0. The surface number 3 corresponds to the optical surface S1. The surface number 5 corresponds to the optical surface S2. The surface number 7 corresponds to the optical surface S4. The surface number 8 corresponds to the optical surface S3. A surface number 10 represents a position of the pupil of the eye of a user. A surface number 11 represents a surface of a virtual image that is presented to the user.

Surfaces represented by the surface numbers 2 and 3 are aspherical surfaces, and their sags Z are defined using Expression (8) described above.

A surface represented by the surface number 8 is a Fresnel surface, and the sag Z of a connected surface formed by virtually connecting optical surfaces that are concentrically arranged in the Fresnel surface (surface number 8) is defined using Expression (9) described above.

A surface represented by the surface number 5 is a surface formed by forming a Fresnel surface over an aspherical surface, and the sag Z of the aspherical surface is defined using Expression (8) described above. Further, the aspherical-surface-based sag Z of a connected surface formed by virtually connecting optical surfaces that are concentrically arranged in the Fresnel surface (surface number 5) that is formed over the aspherical surface is defined using Expression (9) described above.

The following are various parameters used in Expression (8) described above with respect to the surfaces represented by the surface numbers 2, 3, and 5. No. means surface number (Table 10).

TABLE 10

| No. | k | A2 | A4 | A6 | A8 | A10 |
|---|---|---|---|---|---|---|
| 2 | 0 | −4.171E−02 | −3.183E−04 | −5.116E−07 | 1.039E−08 | 0.000E+00 |
| 3 | 0 | 2.895E−02 | −2.680E−04 | 1.651E−06 | −3.709E−09 | 1.943E−12 |
| 5 | 0 | −5.554E−02 | 3.098E−05 | −6.911E−08 | 1.460E−10 | −2.400E−13 |

The following are various parameters used in Expression (9) described above with respect to the surfaces represented by the surface numbers 5 and 8 (Table 11).

TABLE 11

| No. | k | A2 | A4 | A6 | A8 | A10 |
|---|---|---|---|---|---|---|
| 5 | 0 | 0 | −3.46E−06 | −8.835E−08 | 1.648E−10 | 0 |
| 8 | 0 | 3.810E−02 | −6.203E−05 | 2.537E−07 | −4.652E−10 | 2.973E−13 |

A surface represented by the surface number 7 is a DOE surface, and a phase amount D that the DOE surface gives to light passing through the DOE surface is defined using Expression (13) described above.

The following are various parameters for a surface represented by the surface number 7 (Table 12).

TABLE 12

| Surface No. | k | A2 | Diffraction Order m | Reference Wavelength λ, (mm) |
| --- | --- | --- | --- | --- |
| 7 | 0 | −2.22E+01 | 1 | 0.533E-3 |

The diagonal length of the display plane DP of the display panel DE is 20 mm, the maximum field angle FV is 90 degrees, the distance FB between the effective rear focal point XP and the eyepiece EP is 19.11 mm, and the focal length FL of the eyepiece EP is 16.99 mm. Thus, the conditions that the diagonal length of the display plane DP not be greater than 40 mm, the maximum field angle of the eyepiece EP be greater than 80 degrees, the distance FB not be less than 15 mm, and the focal length FL not be greater than 25 mm are satisfied. With respect to the optical surface S2 that is a Fresnel surface of the second element E2, the optical surface S3 that is a Fresnel surface of the third element E3, and the DOE surface, the distance on the optical axis of the eyepiece EP between the optical surface S2 (surface number 5) situated closest to the side of the display panel DE and the optical surface S3 (surface number 8) situated closest to the side of the positive direction is 2.88 mm, the optical surface S2 and the optical surface S3 being situated opposite to each other across the optical surface S4 (surface number 7) that is a DOE surface. Thus, the condition that the distance on the optical axis of the eyepiece EP between one of the surfaces that is situated closest to the side of the display panel DE and another one of the surfaces that is situated closest to the side of the positive direction be one third of the focal length FL of the eyepiece EP or less is also satisfied.

The curvature of a connected surface formed by virtually connecting optical surfaces that are concentrically arranged in a Fresnel surface and the curvature of an aspherical surface are obtained using Expression (10) described above, and the value in Expression (10) is calculated by substituting z'(s) in Expression (11) and z"(s) in Expression (12), where the sag Z is differentiated with respect to the distance s from the optical axis in Expression (11) and Expression (12).

Figure 30:
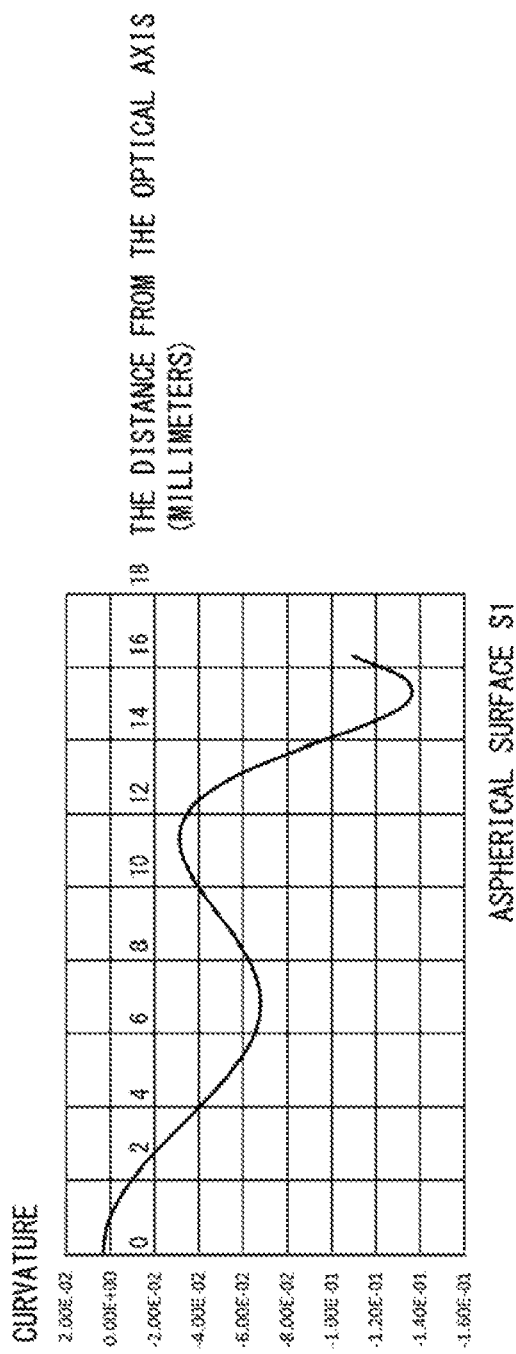
FIG. 30 is a graph of a curvature of a second optical surface.
Figure 31:
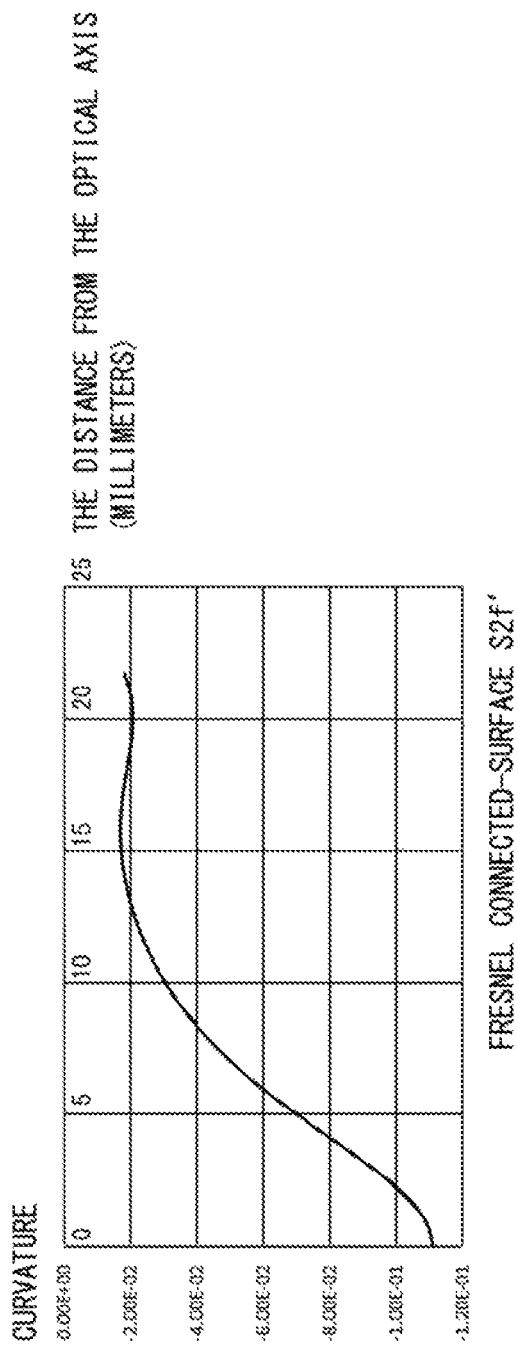
FIG. 31 is a graph of a curvature of a connected surface in a Fresnel surface of a second element.
Figure 32:
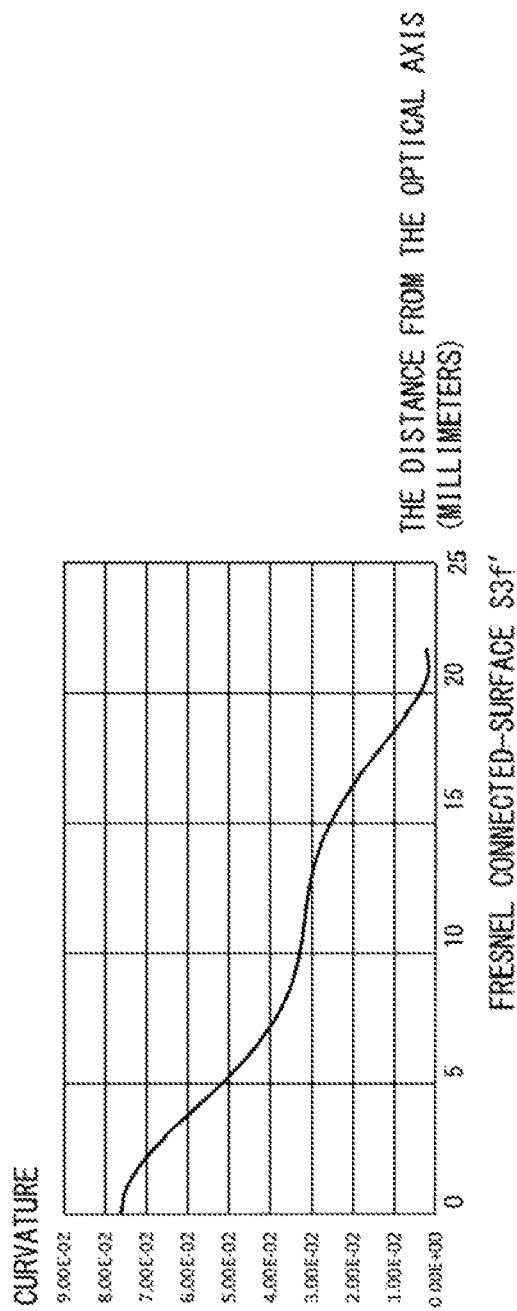
FIG. 32 is a graph of a curvature of a connected surface in a Fresnel surface of a third element.

The curvatures of the optical surfaces S0 and S1 are obtained by substituting the data for the surface numbers 2 and 3 described above, and graphs of these curvatures in FIGS. 29 and 30 are respectively created. With respect to the optical surfaces S2 and S3 that are Fresnel surfaces, the curvatures of the connected surfaces described in FIGS. 5 and 6 (the connected surface S2f and the connected surface S3f, respectively) are obtained by substituting the data for the surface numbers 5 and 8, and graphs of these curvatures in FIGS. 31 and 32 are respectively created, each connected surface being formed by virtually connecting optical surfaces that are concentrically arranged in the respective Fresnel surface.

Figure 29:
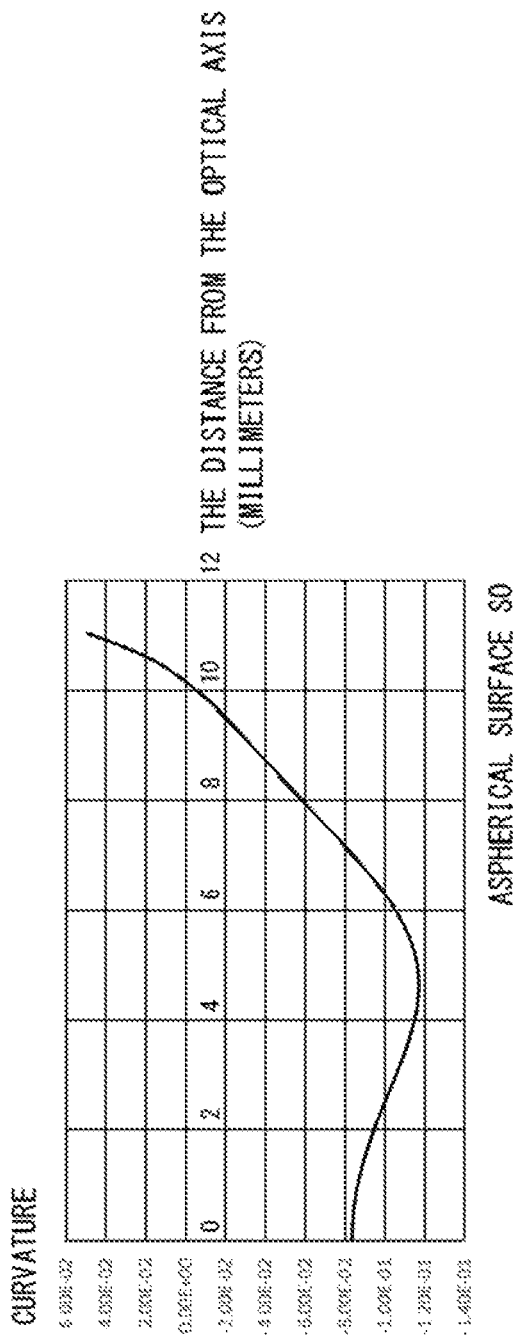
FIG. 29 is a graph of a curvature of a first optical surface.

As illustrated in FIG. 29, the entire optical surface S0 has a negative curvature except for its outer region. As illustrated in FIG. 30, the outer region of the optical surface S1 has a negative curvature and is convex toward the outside of the medium. As illustrated in FIG. 31, the connected surface S2f has a negative curvature on its optical-axis region, and the curvature varies in the positive direction from a point intersecting the optical axis to an outer region. As illustrated in FIG. 32, the connected surface S3f has a positive curvature on its optical-axis region, and the curvature varies in the positive direction from a point intersecting the optical axis to an outer region.

The refractive power P4 of the optical surface S4 that is a DOE surface is calculated as below, using Expression (14) described above.

$$P4=3.8\times10^3 \quad (17)$$

The refractive power P4 defined by Expression (17), P0 (=1/FL), and V0 (=(V2+V3)/2) satisfy Expression (5).

Figure 33:
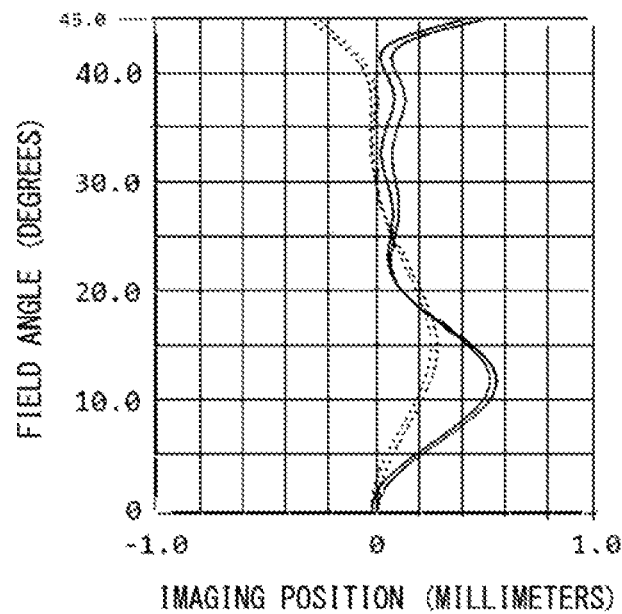
FIG. 33 is a graph that illustrates an imaging performance of the eyepiece.
Figure 34:
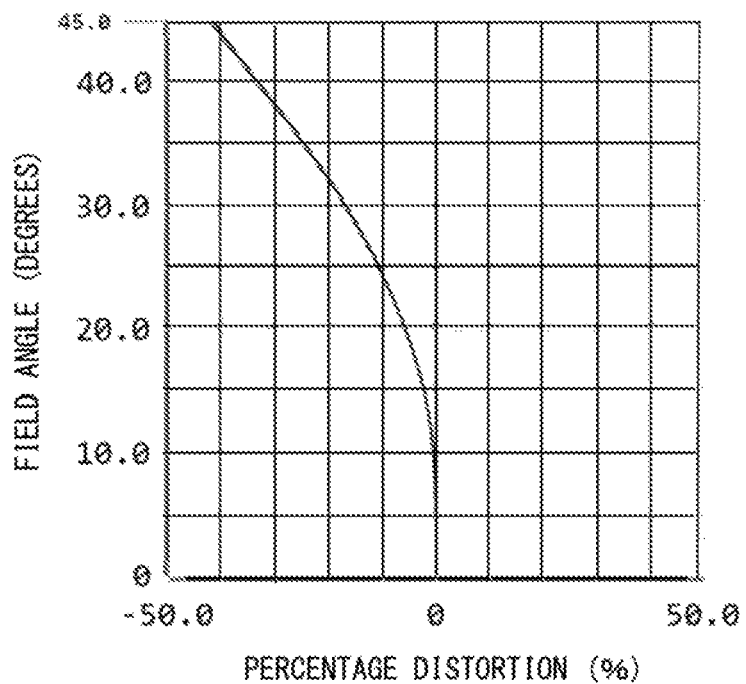
FIG. 34 is another graph that illustrates the imaging performance of the eyepiece.

Further, FIGS. 33 and 34 illustrate an imaging performance of the eyepiece EP in the fourth example. For convenience, FIGS. 33 and 34 illustrate an imaging performance when a light ray is traced from a position of a virtual image created by the eyepiece EP to the display plane DP through the eyepiece EP, so as to perform imaging.

FIG. 33 is a graph of a field curvature in which the vertical axis represents a field angle (degrees) and the horizontal axis represents an imaging position (mm). The solid line represents a tangential field curvature and the broken line represents a sagittal field curvature. The graph depicts a tangential field curvature and a sagittal field curvature of a light ray of a wavelength of 0.656E-03 mm, a tangential field curvature and a sagittal field curvature of a light ray of a wavelength of 0.588E-03 mm, and a tangential field curvature and a sagittal field curvature of a light ray of a wavelength of 0.486E-03 mm. The tangential field curvatures overlap one another, which makes them look as if they were almost one curve. The sagittal field curvatures overlap one another, which makes them look as if they were almost one curve. In other words, both of the imaging positions of the tangential image surface and the sagittal image surface remain substantially unchanged. Thus, the axial chromatic aberration that occurs in the eyepiece EP is favorably corrected.

FIG. 34 is a graph of a percentage distortion in which the vertical axis represents a field angle (degrees) and the horizontal axis represents a relative value of an image distortion that is obtained with a distance between the optical axis and an image without distortion (an ideal image height) used as a reference. Here, the relative value of an image distortion is calculated by subtracting the ideal image height from an actual image height and by dividing the obtained result by the ideal image height.

FIG. 34 illustrates curves that represent percentage distortions of the light rays of wavelengths of 0.486E-03 mm, 0.588E-03 mm, and 0.656E-03 mm, respectively, and the curves overlap one another, which makes them look as if they were almost one curve. Thus, the lateral chromatic aberration that occurs in the eyepiece EP is favorably corrected.

Further, as illustrated in FIG. 34, the percentage distortions increase in the negative direction with an increase in field angle. In other words, a barrel distortion is present in an image that is formed on the display plane DP. As described above, FIG. 34 illustrates the case when a light ray is traced from a position of a virtual image created by the eyepiece EP. Thus, it can be said that an image exhibiting a pincushion-type distortion will be created when a light ray is conversely traced from the display plane DP through the eyepiece EP, and it is understood that the eyepiece EP forms a pincushion-type image distortion.

FIFTH EXAMPLE

FIG. 35 illustrates a lens configuration of a video display device 500 according to a fifth example. The eyepiece EP of the video display device 500 includes a first lens group G1 and a second lens group G2.

The first lens group G1 includes a first element E1 that is a refractive lens and that has an optical surface S0 on the side of the display plane DP and an optical surface S1 on the side of the positive direction, wherein the optical surface S0 has a negative refractive power, and the outer region of the optical surface S1 has a negative curvature and is convex toward the outside of a lens medium. The curvature of a surface of each element will be described in detail later.

The second lens group G2 includes a second element E2 that has a DOE surface (optical surface S4) facing the side of the display plane DP and a Fresnel surface (optical surface S2) facing the side of the positive direction, and a third element E3 that has a Fresnel surface (optical surface S3) facing the side of the display plane DP.

The following is lens data according to the fifth example (Table 13).

TABLE 13

| Surface No. | R' | T | nd | vd | Effective Radius |
|---|---|---|---|---|---|
| 1 | ∞ | 10.15 | 1 | 0 | |
| 2 | ∞ | 3.1 | 1.534 | 56 | 11.1 |
| 3 | −18.301 | 0.6 | 1 | 0 | 17.2 |
| 4 | ∞ | 2.0 | 1.534 | 56 | 21.2 |
| 5 | ∞ | 0.60 | 1 | 0 | 21.9 |
| 6 | ∞ | 2.0 | 1.534 | 56 | 21.9 |
| 7 | ∞ | 20 | 1 | 0 | 21.1 |
| 8 | — | −1000 | 1 | 0 | |
| 9 | — | 0 | 1 | 0 | |

R' represents a radius of curvature (mm) on the optical axis of the eyepiece EP with respect to surface numbers 1 and 7, and represents a parameter for obtaining C in Expressions (8), (9), and (13) with respect to surface numbers 2, 3, 4, 5, and 6. T represents a surface interval (mm), nd represents a refractive index, and vd represents an Abbe number. The surface number 1 represents the display plane DP of the display panel DE. The surface numbers 2 to 7 represent optical surfaces that constitute the eyepiece EP. The surface number 2 corresponds to the optical surface S0. The surface number 3 corresponds to the optical surface S1. The surface number 4 corresponds to the optical surface S4. The surface number 5 corresponds to the optical surface S2. The surface number 6 corresponds to the optical surface S3. A surface number 8 represents a position of the pupil of the eye of a user. A surface number 9 represents a surface of a virtual image that is presented to the user.

Surfaces represented by the surface numbers 2 and 3 are aspherical surfaces, and their sags Z are defined using Expression (8) described above.

Surfaces represented by the surface numbers 5 and 6 are Fresnel surfaces, and the sag Z of a connected surface formed by virtually connecting optical surfaces that are concentrically arranged in the Fresnel surface (surface number 5, 6) is defined using Expression (9) described above.

The following are various parameters for the surfaces represented by the surface numbers 2, 3, 5, and 6. No. means surface number (Table 14).

TABLE 14

| No. | k | A2 | A4 | A6 | A8 | A10 |
|---|---|---|---|---|---|---|
| 2 | 0 | −5.795E−02 | −1.179E−04 | −1.165E−06 | 1.016E−08 | 0.000E+00 |
| 3 | 0 | 2.765E−02 | −1.226E−04 | 7.922E−07 | −1.809E−09 | 1.123E−12 |
| 5 | 0 | −5.252E−02 | 4.898E−05 | −1.801E−07 | 4.496E−10 | −3.943E−13 |
| 6 | 0 | 3.620E−02 | −3.582E−05 | 1.018E−07 | −1.387E−10 | 4.129E−14 |

A surface represented by the surface number 4 is a DOE surface, and a phase amount D that the DOE surface gives to light passing through the DOE surface is defined using Expression (13) described above.

The following are various parameters for a surface represented by the surface number 4 (Table 15).

TABLE 15

| Surface No. | k | A2 | Diffraction Order m | Reference Wavelength λ, (mm) |
|---|---|---|---|---|
| 4 | 0 | −1.56E+01 | 1 | 0.533E−3 |

The diagonal length of the display plane DP of the display panel DE is 19.8 mm, the maximum field angle FV is 90 degrees, the distance FB between the effective rear focal point XP and the eyepiece EP is 20 mm, and the focal length FL of the eyepiece EP is 17.27 mm. Thus, the conditions that the diagonal length of the display plane DP not be greater than 40 mm, the maximum field angle of the eyepiece EP be greater than 80 degrees, the distance FB not be less than 15 mm, and the focal length FL not be greater than 25 mm are satisfied. With respect to the optical surface S2 that is a Fresnel surface of the second element E2, the optical surface S3 that is a Fresnel surface of the third element E3, and the DOE surface, the distance on the optical axis of the eyepiece EP between the optical surface S4 (surface number 4) that is a DOE surface and is situated closest to the side of the display panel DE, and the optical surface S3 (surface number 6) situated closest to the side of the positive direction is 2.6 mm, the optical surface S4 and the optical surface S3 being situated opposite to each other across the optical surface S2. Thus, the condition that the second element E2 and the third element E3 be arranged close to each other such that the distance on the optical axis of the eyepiece EP between one of the surfaces that is situated closest to the side of the display panel DE and another one of the surfaces that is situated closest to the side of the positive direction is one third of the focal length FL of the eyepiece EP or less is also satisfied.

The curvature of a connected surface formed by virtually connecting optical surfaces that are concentrically arranged in a Fresnel surface and the curvature of an aspherical surface are obtained using Expression (10) described above, and the value in Expression (10) is calculated by substituting z'(s) in Expression (11) and z"(s) in Expression (12), where the sag Z is differentiated with respect to the distance s from the optical axis in Expression (11) and Expression (12).

Figure 37:
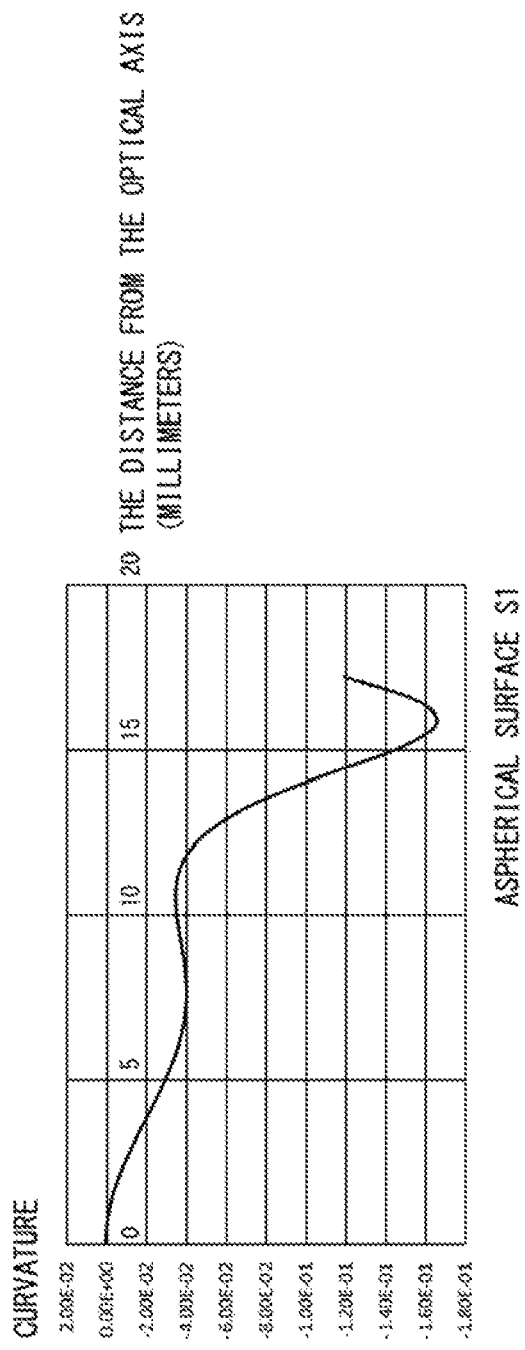
FIG. 37 is a graph of a curvature of a second optical surface.
Figure 38:
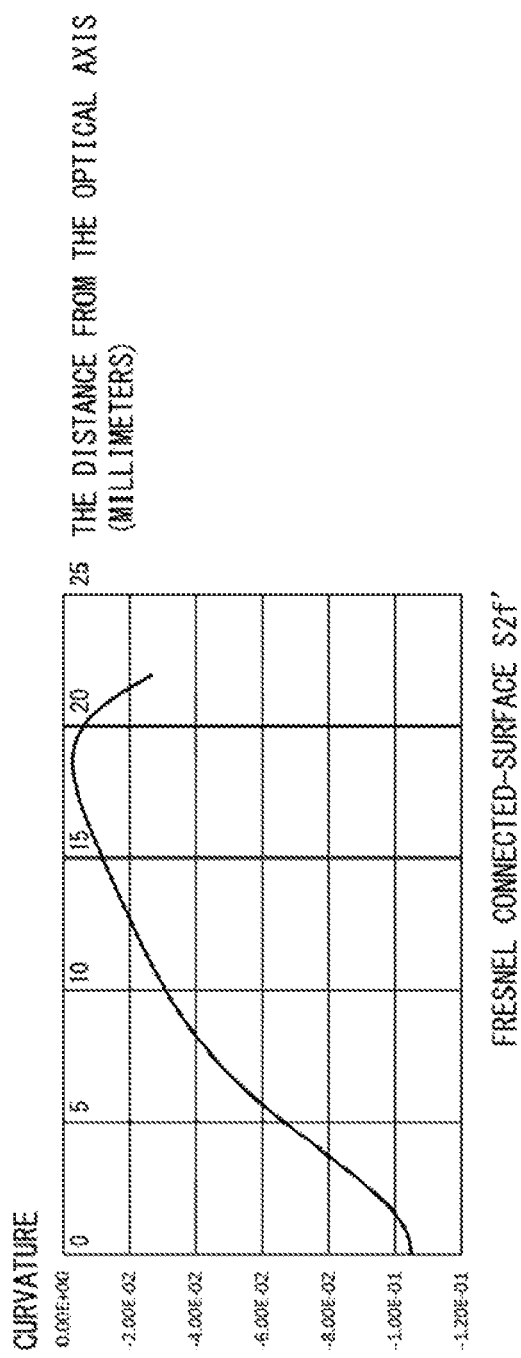
FIG. 38 is a graph of a curvature of a connected surface in a Fresnel surface of a second element.
Figure 39:
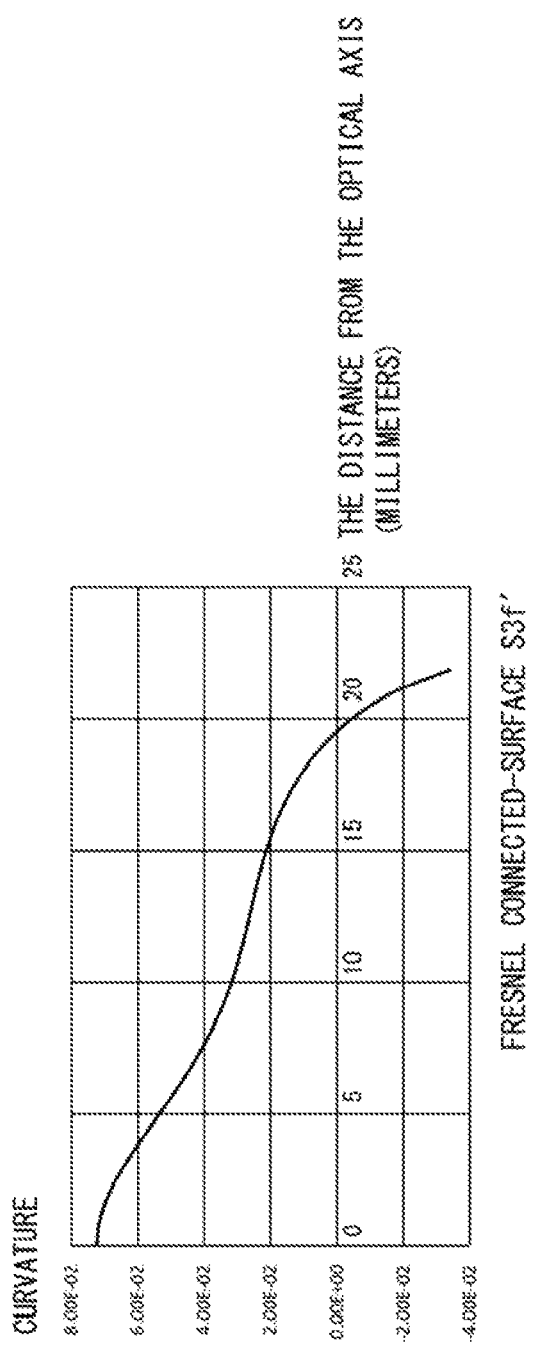
FIG. 39 is a graph of a curvature of a connected surface in a Fresnel surface of a third element.

The curvatures of the optical surfaces S0 and S1 are obtained by substituting the data for the surface numbers 2 and 3 described above, and graphs of these curvatures in FIGS. 36 and 37 are respectively created. With respect to the optical surfaces S2 and S3 that are Fresnel surfaces, the curvatures of the connected surfaces described in FIGS. 5 and 6 (the connected surface S2$f$ and the connected surface S3$f$, respectively) are obtained by substituting the data for the surface numbers 5 and 8, and graphs of these curvatures in FIGS. 38 and 39 are respectively created, each connected surface being formed by virtually connecting optical surfaces that are concentrically arranged in the respective Fresnel surface.

Figure 36:
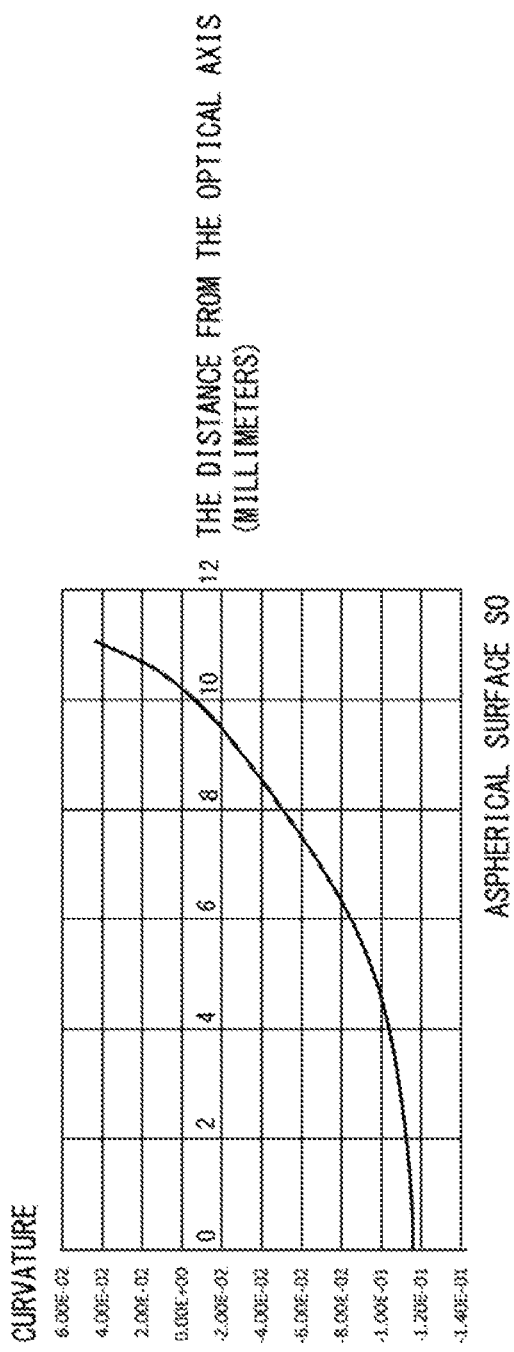
FIG. 36 is a graph of a curvature of a first optical surface.

As illustrated in FIG. 36, the entire optical surface S0 has a negative curvature except for its outer region. As illustrated in FIG. 37, the outer region of the optical surface S1 has a negative curvature and is convex toward the outside of the medium. As illustrated in FIG. 38, the connected surface S2$f$ has a negative curvature on it optical-axis region, and the curvature varies in the positive direction from a point intersecting the optical axis to an outer region. As illustrated in FIG. 39, the connected surface S3$f$ has a positive curvature on its optical-axis region, and the curvature varies in the positive direction from a point intersecting the optical axis to an outer region.

The refractive power P4 of the optical surface S4 that is a DOE surface is calculated as below, using Expression (14) described above.

$$P4 = 2.6 \times 10^{-3} \quad (18)$$

The refractive power P4 defined by Expression (18), P0 (=1/FL), and V0 (=(V2+V3)/2) satisfy Expression (5).

Figure 41:
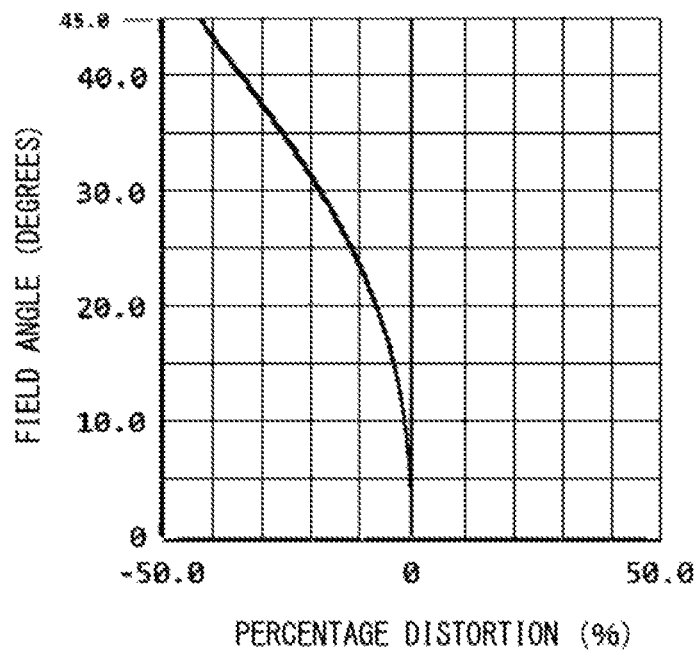
FIG. 41 is another graph that illustrates the imaging performance of the eyepiece.

Further, FIGS. 40 and 41 illustrate an imaging performance of the eyepiece EP in the fifth example. For convenience, FIGS. 40 and 41 illustrate an imaging performance when a light ray is traced from a position of a virtual image created by the eyepiece EP to the display plane DP through the eyepiece EP, so as to perform imaging.

FIG. 40 is a graph of a field curvature in which the vertical axis represents a field angle (degrees) and the horizontal axis represents an imaging position (mm). The solid line represents a tangential field curvature and the broken line represents a sagittal field curvature. L1 represents a line that corresponds to a sagittal field curvature of a light ray of a wavelength of 0.486E-03 mm, and L4 represents a line that corresponds to a tangential field curvature of the light ray of a wavelength of 0.486E-03 mm. L2 represents a line that corresponds to a sagittal field curvature of a light ray of a wavelength of 0.588E-03 mm, and L5 represents a line that corresponds to a tangential field curvature of the light ray of a wavelength of 0.588E-03 mm. L3 represents a line that corresponds to a sagittal field curvature of a light ray of a wavelength of 0.656E-03 mm, and L6 represents a line that corresponds to a tangential field curvature of the light ray of a wavelength of 0.656E-03 mm.

As illustrated in FIG. 40, both of the imaging positions of the tangential image surface and the sagittal image surface remain substantially unchanged, so the axial chromatic aberration that occurs in the eyepiece EP is favorably corrected.

FIG. 41 is a graph of a percentage distortion in which the vertical axis represents a field angle (degrees) and the horizontal axis represents a relative value of an image distortion that is obtained with a distance between the optical axis and an image without distortion (an ideal image height) used as a reference. Here, the relative value of an image distortion is calculated by subtracting the ideal image height from an actual image height and by dividing the obtained result by the ideal image height.

FIG. 41 illustrates curves that represent percentage distortions of the light rays of wavelengths of 0.486E-03 mm, 0.588E-03 mm, and 0.656E-03 mm, respectively, and the curves overlap one another, which makes them look as if they were almost one curve. Thus, the lateral chromatic aberration that occurs in the eyepiece EP is favorably corrected.

Further, as illustrated in FIG. 41, the percentage distortions increase in the negative direction with an increase in field angle. In other words, a barrel distortion is present in an image that is formed on the display plane DP. As described above, FIG. 41 illustrates the case when a light ray is traced from a position of a virtual image created by the eyepiece EP. Thus, it can be said that an image exhibiting a pincushion-type distortion will be created when a light ray is conversely traced from the display plane DP through the eyepiece EP, and it is understood that the eyepiece EP forms a pincushion-type image distortion.

The embodiments and the examples described above are just specific examples to facilitate understanding of the present invention, and the present invention is not limited to these embodiments and examples. Various modifications and alterations may be made to the video display device described above without departing from the spirit and scope of the invention specified in the claims.

What is claimed is:

1. A near-to-eye video display device comprising:
an eyepiece, the eyepiece having an optical axis; and
a display panel, the display panel having a display plane, the display plane to output light, the display panel has a diagonal length that is not greater than 40 mm near a front focal position of the eyepiece, wherein the eyepiece further comprising:
a first lens group and a second lens group in order from a side of the display panel in a positive direction, where the positive direction is a direction in which light emitted from the display panel travels along the optical axis; the first lens group further comprising:
a first element that is a refractive lens and that has a first optical surface on the side of the display panel and a second optical surface on a side of the positive direction, wherein the first optical surface has a negative refractive power and an outer region of the second optical surface has a negative curvature and is convex toward the outside of a lens medium; the second lens group further comprising, in order from the display panel in the positive direction, a second element that has a Fresnel surface facing the side of the positive direction and having a positive refractive power, and a third element that has a Fresnel surface facing the side of the display panel and having a positive refractive power, the second element and the third element being arranged close to each other; and the eyepiece emits light at a maximum field angle that is not less than 80 degrees.

2. The video display device according to claim 1, wherein the second lens group includes an element that has a DOE (diffractive optical element) surface having a positive refractive power.

3. The video display device according to claim 2, wherein with respect to the Fresnel surface of the second element, the Fresnel surface of the third element, and the DOE surface, a distance on the optical axis between one of the surfaces that is situated closest to the side of the display panel and another one of the surfaces that is situated closest to the side of the positive direction is one third of a focal length of the eyepiece or less.

4. The video display device according to claim 2, wherein the DOE surface is arranged between the Fresnel surface of the second element and the Fresnel surface of the third element.

5. The video display device according to claim 4, wherein when a refractive power of the eyepiece is P0, an Abbe number of the second element is V2, an Abbe number of the third element is V3, a refractive power of the DOE surface is P4 and V0=(V2+V3)/2, a relational expression below holds:

$$3.453 \times (P0/V0) \times 0.7 < P4 < 3.453 \times (P0/V0) \times 1.3.$$

6. The video display device according to claim 1, wherein a curvature of the second optical surface of the first element varies in the positive direction from an outer region to a point intersecting the optical axis and a curvature of a connected surface formed by virtually connecting optical flat surfaces that are concentrically arranged in the Fresnel surface of the second element varies in the positive direction from a point intersecting the optical axis to an outer region, and a curvature of a connected surface formed by virtually connecting optical flat surfaces that are concentrically arranged in the Fresnel surface of the third element varies in a negative direction from a point intersecting the optical axis to an outer region.

7. The video display device according to claim 1 wherein the second element has a concave surface facing the side of the display panel.

8. The video display device according to claim 1, wherein the eyepiece refracts a light ray that is output from the display plane in a direction perpendicular to the display plane and whose inclination angle to the optical axis of the eyepiece when the light ray is emitted from the third element is one fourth of the maximum field angle, such that a point of intersection of the light ray and the optical axis of the eyepiece is situated 15 mm or more away from the eyepiece in the positive direction.

\* \* \* \* \*